US007889923B1

(12) United States Patent
Carr et al.

(10) Patent No.: US 7,889,923 B1
(45) Date of Patent: Feb. 15, 2011

(54) SYSTEM AND METHOD FOR SPARSE HISTOGRAM MERGING

(75) Inventors: Nathan A. Carr, Santa Clara, CA (US); Gavin S. P. Miller, Los Altos, CA (US)

(73) Assignee: Adobe Systems Incorporated, San Jose, CA (US)

( * ) Notice: Subject to any disclaimer, the term of this patent is extended or adjusted under 35 U.S.C. 154(b) by 927 days.

(21) Appl. No.: 11/756,402

(22) Filed: May 31, 2007

(51) Int. Cl.
*G06K 9/00* (2006.01)
(52) U.S. Cl. .......................... 382/168; 382/169; 382/172
(58) Field of Classification Search ................. 382/168, 382/169, 128, 305, 261, 271, 172, 130; 345/424; 378/28; 702/182, 185; 707/999.1
See application file for complete search history.

(56) References Cited

U.S. PATENT DOCUMENTS

| | | |
|---|---|---|
| 4,947,446 A | 8/1990 | Jutand |
| 5,168,375 A | 12/1992 | Reisch |
| 5,426,684 A | 6/1995 | Gaborski et al. |
| 5,471,987 A | 12/1995 | Nakazawa et al. |
| 5,681,112 A | 10/1997 | Kuroda |
| 6,034,690 A | 3/2000 | Gallery |
| 6,163,621 A | 12/2000 | Paik et al. |
| 6,347,153 B1 | 2/2002 | Triplett et al. |
| 6,956,582 B2 | 10/2005 | Tidwell |
| 7,010,163 B1 | 3/2006 | Weiss |
| 7,072,528 B2 | 7/2006 | Han |
| 7,146,059 B1 | 12/2006 | Durand et al. |
| 7,239,756 B2 | 7/2007 | Sartor |
| 7,318,781 B2 | 1/2008 | Urushiya |
| 2004/0254799 A1 | 12/2004 | Gallagher |
| 2006/0110063 A1 | 5/2006 | Weiss |
| 2007/0183682 A1 | 8/2007 | Weiss |

OTHER PUBLICATIONS

U.S. Appl. No. 11/749,862, filed May 17, 2007.
U.S. Appl. No. 11/756,409, filed May 31, 2007.
Weiss, "Fast Median and Bilateral Filtering," ACM Transactions on Graphics, vol. 25 , Issue 3 (Jul. 2006), Proceedings of ACM SIGGRAPH 2006, pp. 519-526.
Paris, et al, "A Fast Approximation of the Bilateral Filter Using a Signal Processing Approach," Proceedings of the European Conference on Computer Vision, 2006.

(Continued)

*Primary Examiner*—Anh Hong Do
(74) *Attorney, Agent, or Firm*—Robert C. Kowert; Meyertons, Hood, Kivlin, Kowert & Goetzel, P.C.

(57) ABSTRACT

A method for merging histograms may include generating a histogram for a region of an image, the histogram including bucket values representing a count of pixels having the same pixel value or a weighting dependent on the pixels. The method may include maintaining an array of values indicating non-zero histogram entries for a group of bucket values (e.g., a count of non-zero bucket values in the group or a bitmask indicating if each bucket value is non-zero). A sparse histogram for which such an array exists may be merged with a second histogram. Merging the histograms may include not merging any bucket values in the group if the associated array value is zero, and merging some or all of the bucket values if it is non-zero. The methods disclosed may be implemented by program instructions executing in parallel on CPU(s) or GPUs.

30 Claims, 16 Drawing Sheets

OTHER PUBLICATIONS

Terdiman, "Radix Sort Revisited," 2000, http://www.codercorner.com/RadixSortRevisited.html.

Huang, "A Fast Two-Dimensional Median Filtering Algorithm," Acoustics, Speech, and Signal Processing [see also IEEE Transactions on Signal Processing], IEEE Transactions, vol. 27, Issue 1, Feb. 1979, pp. 13-18.

Williams, "Pyramidal Parametrics", Computer Graphics, vol. 17, No. 3, July 1983, pp. 1-11.

Crow, "Summed-Area Tables for Texture Mapping," Computer Graphics, vol. 18, No. 3, Jul. 1984, pp. 207-212.

Giovanni Garibotto, Livio Lambarelli, "Fast on-line Implementation of Two-Dimensional Median Filtering," Electronics Letters, vol. 15, No. 1, Jan. 4, 1979, pp. 24-25.

Huttunen, H. & Yli-Harja, O., "Fast Algorithm for Updating the Local Histogram of Multidemensional Signals," Proceedings 1999 International Symposium on Nonlinear Theory and Its Applications (NOLTA '99), Hilton Waikoloa Village, Hawaii, USA, Nov. 28-Dec. 2, 1999, pp. 65-68.

U.S. Appl. No. 11/292,184, filed Nov. 29, 2005.

U.S. Appl. No. 12/323,009, filed Nov. 25, 2008.

Fredo Durand and Julie Dorsey, "Fast bilateral filtering for the display of high-dynamic-range images," ACM Transactions on Graphics (TOG), Proceedings of the 29th annual conference on computer graphics and interactive techniques SIGGRAPH '02, vol. 21, issue 3.

Qimei Hu, et al. "Mutli-scale edge detection with bilateral filtering in apiral architecture," Proceedings of the Pan-Sydney area Workshop on Visual Information Processing VIP '05, publisher: Australian Computer Society, Inc.

|  | A1 | A2 | A3 | A4 | A5 | A6 | A7 | A8 | A9 | A10 |
|---|---|---|---|---|---|---|---|---|---|---|
| row 101a j=6 |  |  |  |  |  |  |  |  |  |  |
| row 101b j=5 | B1 | B2 | B3 | B4 | B5 | B6 | B7 | B8 | B9 | B10 |
| row 101c j=4 | C1 | C2 | C3 | C4 | C5 | C6 | C7 | C8 | C9 | C10 |
| row 101d j=3 | D1 | D2 | D2 | D4 | D5 | D6 | D7 | D8 | D9 | D10 |
| row 101e j=2 | E1 | E2 | E3 | E4 | E5 | E6 | E7 | E8 | E9 | E10 |
| row 101f j=1 | F1 | F2 | F3 | F4 | F5 | F6 | F7 | F8 | F9 | F10 |
| row 101g j=0 | G1 | G2 | G3 | G4 | G5 | G6 | G7 | G8 | G9 | G10 |

100 image column 102d i=3
column 102e i=4
column 102f i=5

*FIG. 3*

| | A1 | A2 | A3 | A4 | A5 | A6 | A7 | A8 | A9 | A10 |
|---|---|---|---|---|---|---|---|---|---|---|
| row 101a j=6 | | | | | | | | | | |
| row 101b j=5 | B1 | B2 | B3 | B4 | B5 | B6 | B7 | B8 | B9 | B10 |
| row 101c j=4 | C1 | C2 | C3 | C4 | C5 | C6 | C7 | C8 | C9 | C10 |
| row 101d j=3 | D1 | D2 | D2 | D4 | D5 | D6 | D7 | D8 | D9 | D10 |
| row 101e j=2 | E1 | E2 | E3 | E4 | E5 | E6 | E7 | E8 | E9 | E10 |
| row 101f j=1 | F1 | F2 | F3 | F4 | F5 | F6 | F7 | F8 | F9 | F10 |
| row 101g j=0 | G1 | G2 | G3 | G4 | G5 | G6 | G7 | G8 | G9 | G10 | column 102d i=3
column 102e i=4
column 102f i=5

100 image

*FIG. 4*

| | A1 | A2 | A3 | A4 | A5 | A6 | A7 | A8 | A9 | A10 |
|---|---|---|---|---|---|---|---|---|---|---|
| row 101a, j=6 | A1 | A2 | A3 | A4 | A5 | A6 | A7 | A8 | A9 | A10 |
| row 101b, j=5 | B1 | B2 | B3 | B4 | B5 | B6 | B7 | B8 | B9 | B10 |
| row 101c, j=4 | C1 | C2 | C3 | C4 | C5 | C6 | C7 | C8 | C9 | C10 |
| row 101d, j=3 | D1 | D2 | D2 | D4 | D5 | D6 | D7 | D8 | D9 | D10 |
| row 101e, j=2 | E1 | E2 | E3 | E4 | E5 | E6 | E7 | E8 | E9 | E10 |
| row 101f, j=1 | F1 | F2 | F3 | F4 | F5 | F6 | F7 | F8 | F9 | F10 |
| row 101g, j=0 | G1 | G2 | G3 | G4 | G5 | G6 | G7 | G8 | G9 | G10 | column 102e, i=4
column 102f, i=5
column 102g, i=6
100 image

*FIG. 6*

| | | | | | | | | | | |
|---|---|---|---|---|---|---|---|---|---|---|
| row 101a j=6 | A1 | A2 | A3 | A4 | A5 | A6 | A7 | A8 | A9 | A10 |
| row 101b j=5 | B1 | B2 | B3 | B4 | B5 | B6 | B7 | B8 | B9 | B10 |
| row 101c j=4 | C1 | C2 | C3 | C4 | C5 | C6 | C7 | C8 | C9 | C10 |
| row 101d j=3 | D1 | D2 | D2 | D4 | D5 | D6 | D7 | D8 | D9 | D10 |
| row 101e j=2 | E1 | E2 | E3 | E4 | E5 | E6 | E7 | E8 | E9 | E10 |
| row 101f j=1 | F1 | F2 | F3 | F4 | F5 | F6 | F7 | F8 | F9 | F10 |
| row 101g j=0 | G1 | G2 | G3 | G4 | G5 | G6 | G7 | G8 | G9 | G10 | column 102d i=3
column 102e i=4
column 102f i=5
100 image

*FIG. 7*

SYSTEM AND METHOD FOR SPARSE HISTOGRAM MERGING

BACKGROUND

1. Field of the Invention

The present invention is directed to computer systems. More particularly, it is directed to image processing.

2. Description of the Related Art

Image processing often involves the application of various filtering operations on image data using one or more convolution operations. For example, a median filter looks at pixel values (e.g., values indicating the color and/or intensity of the pixels in an image) within a box-shaped region around each pixel and selects the median value for the resulting image (i.e., the filtered output image.) In another example, a bilateral box filter replaces the value at a pixel, (i, j, k), with a weighted sum of the pixel values in the neighborhood of the pixel. Each weight is the product of a factor dependent on the distance (in pixels) to (i, j, k) and another factor dependent on the difference in intensity between the pixels and the pixel at (i, j, k).

These and other filters are typically implemented using a series of convolution steps performed across the rows and columns of an image. These convolutions may involve large numbers of operations on subsets of the input image data, and are often implemented by applying a kernel of support over the image in a sliding window. Different techniques for speeding up convolutions on image data have been developed, including the use of histograms. A histogram may be expressed as an array of buckets whose values are dependent on the values of pixels in a given region of an image. Once computed, the histogram may be used to accelerate median filtering, bilateral filtering, and other filtering functions. For example, a histogram whose values represent counts of pixel values may be searched to find the pixel value greater than half the population (i.e., the median value). However, histograms can be expensive to generate, maintain, and operate on, especially for images and/or kernels containing a large number of pixels.

SUMMARY

A system and method for performing sparse histogram merging by maintaining an acceleration data structure to keep track of empty and/or non-zero histogram entries is disclosed. The method may in some embodiments be applied to image processing functions that use histogram-based convolution, such as various filtering techniques performed on image data. The method may in some embodiments include generating a histogram for a region of an input image that includes a plurality of bucket values. Each bucket value in the histogram may be dependent on values of pixels in the region. For example, in some embodiments each of the bucket values may represent a count of pixels in the region having the same pixel value. In other embodiments, each of the bucket values may represent a weighting dependent on the values of pixels in the region and/or the locations of pixels within the region.

The method may in some embodiments include generating and maintaining an acceleration data structure that indicates empty and/or non-zero histogram entries. For example, the acceleration data structure may be implemented as array that includes a plurality of array values, each associated with one or more of the bucket values, and each being dependent on the bucket values. In some embodiments, each array value may represent a count of the non-zero bucket values included in the plurality of bucket values associated with the array value. In other embodiments, each of the array values may represent a bitmask and the values of the bits in the bitmask may indicate whether each of the plurality of bucket values associated with the array value is non-zero.

The method for sparse histogram merging may in some embodiments include merging a histogram for which an acceleration data structure has been generated with a second histogram to produce a third histogram. The second histogram may include a second plurality of bucket values and each bucket value in the second plurality of bucket values may be dependent on values of pixels in a second region in the same way that the corresponding bucket values in the sparse histogram are dependent on the values of pixels in the first region of the image. In general, merging two histograms may include adding the bucket values of one histogram to corresponding bucket values of the other histogram, or performing another operation on corresponding bucket values of the two histograms in order to combine them.

In some embodiments, merging the two histograms may include determining if each array value is non-zero, and not merging the corresponding bucket values in the two histograms if the array value is zero. If, on the other hand, the array value is non-zero, all of the bucket values of the sparse histogram associated with the non-zero array value may be merged with corresponding bucket values of the second histogram, or only those bucket values in the sparse histogram that are actually non-zero may be merged with corresponding bucket values of the second histogram, in different embodiments. In some embodiments, determining which, if any, of the bucket values associated with a non-zero array value is non-zero may include locating the first non-zero value in a bitmask represented by the non-zero array value.

The method described herein for sparse histogram merging may include maintaining the validity of the array values associated with each group of bucket values when pixel values in the input image and/or bucket values in an associated image histogram change. For example, in response to a change in a bucket value in the histogram, the method may include determining if an array value associated with the bucket value should be changed, and if so, updating the array value to reflect the change in the bucket value. For example, if the change in the bucket value includes a change from a value of zero to a non-zero value, the method may include updating the array value to indicate that an additional non-zero bucket value is included in the plurality of bucket values associated with the array value. In another example, if the change in the bucket value includes a change in the bucket value from a non-zero value to a value of zero, the method may include updating the array value to indicate that one fewer non-zero bucket value is included in the plurality of bucket values associated with the array value.

The methods described herein may be implemented by program instructions executable by one or more general-purpose processors (CPUs) and/or one or more graphics processing units (GPUs) in different embodiments. In some embodiments, histograms and/or acceleration data structures described herein may be generated by program instructions executing in parallel on one or more CPUs or GPUs configured for parallel execution. For example, generation of multiple histograms may be performed by different threads of an application executing on a CPU configured for multi-threaded execution, or by different GPUs configured to operate in parallel. Similarly, merging operations performed on multiple histogram buckets may be performed in parallel on a CPU configured for multi-threaded execution or by different GPUs configured to operate in parallel, in different embodiments. The methods disclosed herein may be implemented by program instructions comprised on one or more computer-readable storage media computer-executable by CPU(s) and/or GPU(s), in various embodiments. The histograms and/or acceleration data structures described herein may be stored on the same storage media as the program instructions (e.g., the same memory) or on a different storage media (and/or in a different memory) than the program instructions, in different embodiments.

BRIEF DESCRIPTION OF THE DRAWINGS

FIGS. 3-8 illustrate performance of integral histogram convolution on an input image, according to one embodiment.

Figure 1A:
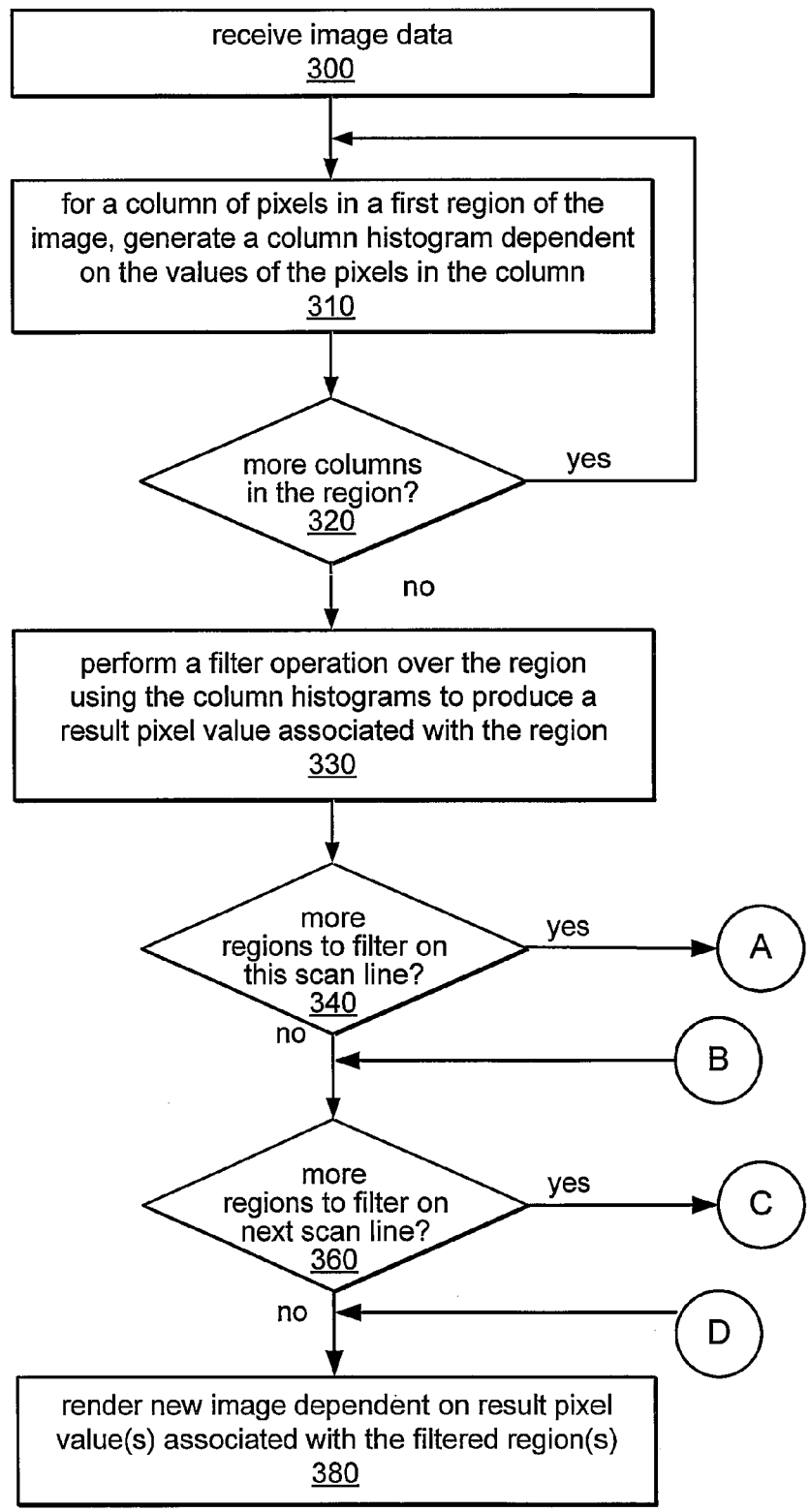
FIGS. 1A-1C illustrate a method for performing integral histogram convolution on an input image, according to one embodiment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Various computer-implemented methods disclosed herein may be used to perform fast histogram-based convolutions for image processing. The methods may be implemented as part of a graphics application that supports various filtering techniques, such as median filtering and bilateral filtering. The techniques disclosed herein may be executed on graphics processing units (GPUs) and/or CPUs, in various embodiments. For example, a graphics application may include support for filtering to achieve blurring, anti-aliasing, blending, or other filtering operations that include convolutions using histograms, as described herein.

Traditionally, convolution is performed on an input image by passing a window (also called the "support") across the image. An output pixel value corresponding to each given input pixel value may be calculated by computing a weighted sum (or other function) of all the input pixels in the window when the given pixel is in a particular position in the window (e.g., in a particular corner, or in the center of the window). The weight applied to each of the input pixels may be different for each pixel of the window. The window including its weights may be referred to as the "convolution kernel."

The methods described herein for computing bilateral and median filtering for image processing may include the use of histograms. In some embodiments, histogram-based filters may be computed efficiently by processing column histograms incrementally, leading to a constant time technique for generating histograms for rectangular kernels of a constant size and shape around each pixel. This technique may be executed in constant time for box-weighted filters, in some embodiments. An extension of this basic algorithm may generate an approximation of a Gaussian-weighted spatial histogram with a cost that is linear with the radius of the kernel. This algorithm may be used to compute a spatially-weighted bilateral filter with relatively low memory requirements and a cost linear with the vertical size of the kernel.

Histogram-Based Convolution

As previously noted, histogram-based convolution has been used to accelerate median and bilateral filtering in image processing. Once computed, a histogram may be searched to find the pixel value greater than half the population (i.e., the median), or the histogram may be used to compute a box-bilateral filter (as described in more detail below). A histogram may be expressed as an array of buckets whose values are dependent on the values of pixels in a given region of an image. For example, the value of each bucket may correspond to a count of the number of pixels in a source population (i.e. a region of pixels) that have a given value or range of values. In some such embodiments, there may be a linear mapping between a bucket index and the pixel value being counted. In the case of 8 bit images, for example, pixel values from 0 to 255 may map to a bucket index having corresponding values from 0 and 255.

Histogram-based convolution may involve generating such a histogram for a range of pixels corresponding to the convolution kernel. For example, for a source set of image pixels I (having coordinates i, j), in a kernel of width $D_x$ and height $D_y$, each of the values H[b] (representing the "height" of a histogram for one bucket entry) may be computed as:

$$H[b] = \Sigma_{i_0}^{i_n} \Sigma_{j_0}^{j_m} \partial(I[i,j] - v(b))$$

In the equation above, $\partial$ represents the delta function that returns a value of 1 for an argument of 0, and 0 otherwise; b represents the bucket index; v(b) represents the pixel value that corresponds to the bucket index b for the given range of pixels; I(i,j) represents the pixel value for the source pixel at coordinates (i,j); $i_n = i_0 + D_x - 1$; and $j_m = j_0 + D_y - 1$. In other words, in this example, the height of the histogram for each bucket index is equal to a count of the pixels in the region whose value matches the pixel value that corresponds to the bucket index value.

For a median filtering operation, such a histogram may be searched to find the pixel value within a region that is greater than half the population (i.e., the median).

For a box bilateral filter, the pixels within the rectangular filter kernel may be averaged together based on a weighting function that depends on the source pixel values (e.g., the color value or intensity value). The filtered output value may also depend on a spatially varying term that depends on the value of the pixel at the center pixel of the kernel (at coordinates $i_C$, $j_C$), called $I_C$. In general, the filtered output value may be expressed as a ratio of the sum of weighted values of the pixels in the neighborhood of a given source pixel divided by the sum of those weights (i.e., as a weighted average).

The filtered output $F_{i0,j0}$ for a box bilateral filter may in some embodiments be computed using a histogram to compute the sum of the weights (w) and the sum of the weighted values ($w_c$) as follows:

$$w = \sum_{b=0}^{b=B} W(v(b), I_C) H(b)$$

$$w_c = \sum_{b=0}^{b=B} W(v(b), I_C) H(b) v(b)$$

$$F_{i0,j0} = \frac{w_c}{w}$$

In this example, W represents a weighting function that is dependent only on the pixel value of each source pixel and not on the pixel location. The cost of direct evaluation of a box bilateral filter operation may be proportional to the number of pixels in the rectangular region. However, when using a histogram (as above) the cost may be linear with the number of buckets B, but independent of the spatial size of the kernel. Therefore, this technique may be especially efficient for computing region histograms for box bilateral filtering of large kernels.

Note that, as used in the remaining examples herein, the value v(b) is assumed to be equal to b (i.e., the bucket index). In other words, integer input pixel values are assumed, with each integer value corresponding to the bucket index. For example, the pixel value corresponding to the bucket with index 0 is a pixel value of 0, the pixel value corresponding to the bucket with index 1 is a pixel value of 1, and so on. Therefore, the histogram may in such embodiments be computed as:

$$H[b] = \Sigma_{i0}^{in} \Sigma_{j0}^{jm} \Theta(I[i,j] - b)$$

Note that in other embodiments, the bucket index and corresponding pixel values may have a different relationship.

A scatter operation may be used to generate a histogram (i.e., to "fill" the buckets of the histogram according to the pixel values of the pixels in a region of interest). Using the assumption above, for a rectangular source region from $(i_0, j_0)$ to $(i_n, j_n)$, the scatter operation $S(i_0, i_n, j_0, j_m)$ may be defined using the following pseudo-code example:

```
For i from i₀ to iₙ
{
    For each j from j₀ to jₘ
    {
        H[I(i, j)] += 1
    }
}
```

In other words, for each pixel in the region, increment the bucket value corresponding to the value of that pixel. Direct evaluation using this technique comes at a cost that is proportional to the number of pixels in the rectangular region of interest.

Integral Histogram Convolution

In some embodiments, a histogram H for the same rectangular source region may be represented as an array of histograms, one for each column of pixels. In such embodiments, the value of the histogram for each column represented by its index i (which may be dependent on its horizontal position on a single scan line) may be defined as:

$$h_i(b) = S(i, i, j_0, j_m)$$

The histogram of the rectangular region H, in some embodiments, may be computed as the merger of the histograms for its sub-regions (i.e., its columns). For example, to compute $H_{i0}(b)$ for the rectangular region from $(i_0, j_0)$ to $(i_n, j_m)$, the column histograms for columns $i_0$ to $i_n$ may be combined (e.g., added together):

$$H_{i0}(b) = \Sigma_{i=i0}^{in} h_i(b)$$

The cost of such a summation for each source region of an input image may be linear in the horizontal resolution of the kernel with the number of buckets in each histogram. For example, in some embodiments the cost may be computed as the number of buckets times the cost of accessing and accumulating an entry in the histogram.

In some embodiments, a new histogram may be computed for each other region in a same scan line by combining an initial region histogram with the column histogram for a next horizontal location in the scan line and removing the contribution of a column histogram no longer within the source region of interest. For example, the region histogram for a source region of the same dimensions as that computed above, but in a next horizontal position on the same scan line (e.g., for a rectangular kernel shifted to the right by one pixel), may be computed as:

$$H_{i0+1}(b) = H_{i0} + h_{i0+1}(b) - h_{i0}(b)$$

In the example above, the histogram for the region starting at the next pixel (horizontally) may be computed by adding one column histogram and subtracting another column histogram (e.g., a preceding column histogram) from the initial histogram (i.e., the histogram for the initial kernel position). This may be equivalent to running a constant cost box filter on the bucket entries along a scan line.

Figure 1B:
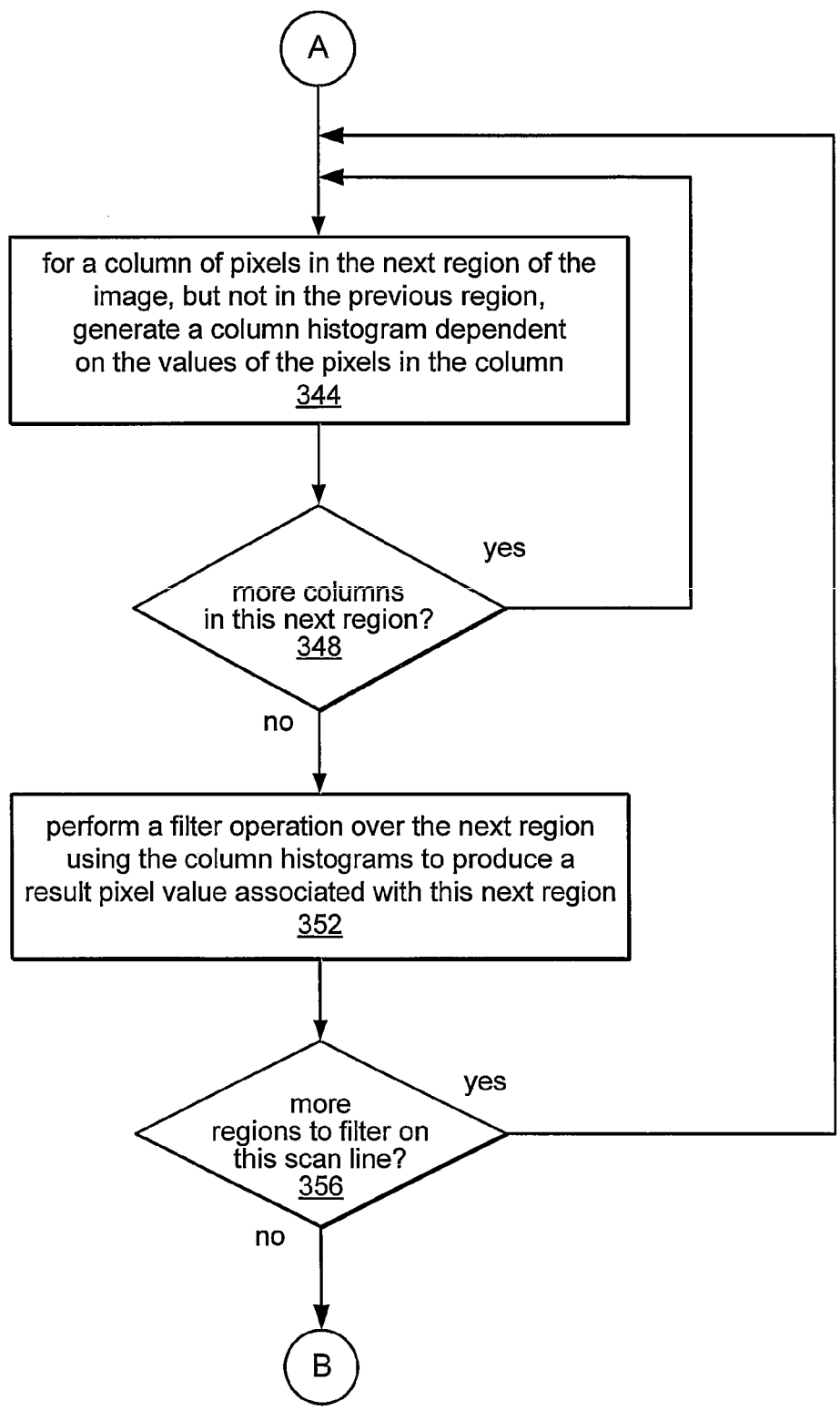
Figure 1C:
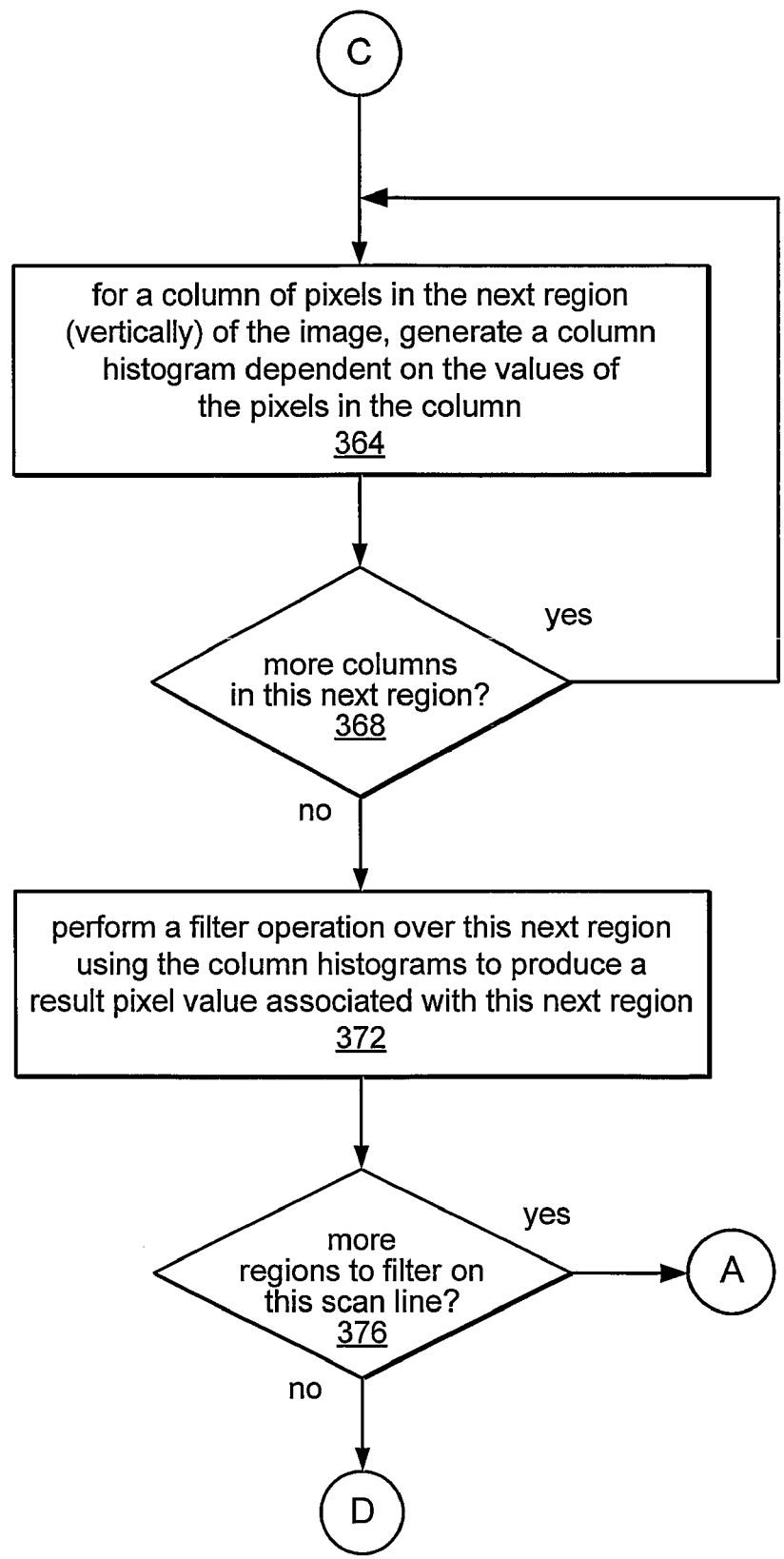

A method for computing a histogram for a source image that may be represented by columns of pixels, according to one embodiment, is illustrated by the flow charts in FIGS. 1A-1C. In this example, image data may be received, as in 300. For example, an image processing application may receive image data when a source image is opened within the application for processing, or the image data may be image data that has already been modified by the image processing application (i.e., it may not correspond to original image data), in different embodiments.

As illustrated at 310, the method may include generating a column histogram for a column of pixels in a first region of the source image. For example, a filtering function may be configured to perform a convolution on a rectangular kernel of the image having a width of 10 pixels and a height of 20 pixels. This kernel may in some embodiments be passed over the source image in the horizontal direction in order to apply the filtering function to the pixels on a same scan line. The first region of the source image may correspond to the kernel being in the first position over the source image. In the example illustrated in FIG. 1A, the values in a column histogram of this first region may be dependent on the values of the pixels in the column. For example, as described above, the values in the column histogram may in some embodiments represent an array of bucket values, and each may represent a count of the pixels in the column having a given pixel value. In other embodiments, the values in the column histogram may represent a sum of weights or a weighted count of the pixels in the column having a given pixel value, or may have a different relationship with the pixels values in the column.

After computing a column histogram for the first column in a kernel region, the method may include determining if there are more columns within the kernel region, as in 320. If there are, illustrated by the positive exit from 320, the method may include generating a column histogram for the next column of pixels in the first region, as illustrated in 310 and described above. As illustrated in FIG. 1A, the operations at 320 and 310 may be repeated for all the columns in the first region.

Once all of the column histograms for the first region have been generated, illustrated by the negative exit from 320, the method may include performing a filter operation over the region using the column histograms to produce a result pixel value associated with the region, as in 330. In some embodiments, this may involve performing a convolution operation on the region histogram represented as the merger of the column histograms corresponding to the region. For example, if the filtering operation is a median filter and each bucket value in the column histograms represents a count of the number of pixels in the column having the same value, the column histograms may be added together and the bucket values searched to find the median pixel value for the entire region. In other words, the bucket values in each column histogram may be added to the corresponding bucket values in the other column histograms to produce a region histogram having bucket values equal to the sum of the corresponding bucket values of all of the column histograms. The values in the buckets of the region histogram may then be searched to find the pixel value greater than half the population (i.e., the median). The result pixel value (i.e., the median value) may represent a new pixel value for one of the pixels in the filtered image output corresponding to one of the pixels in the first region (e.g., a corner or center pixel of the region, in some embodiments).

As illustrated in FIG. 1A, the method may include determining if there are any more regions to which the filtering function should be applied on the same scan line, as in 340. For example, in some embodiments, a convolution kernel may be applied to successive regions of the source image by shifting the kernel horizontally across one scan line of the image, as describe above. If there are more regions to be filtered on the same scan line, shown as the positive exit from 340, the method may include performing the operations illustrated in FIG. 1B, beginning at "A".

As illustrated in FIG. 1B, when a convolution kernel is shifted horizontally over a next region of the source image (e.g., a region largely overlapping the first region), the method may include generating a column histogram for a column of pixels in the next region that was not included in the first region, as in 344. For example, if the kernel is shifted one pixel to the right of its original position, one column of pixels may be included in the new region that was not included in the first region of the image. As illustrated in FIG. 1B, a column histogram may be generated dependent on the values of the pixels in this additional column.

The method may include determining if there are additional columns of pixels in the next region that were not included in the first region, as in 348. For example, in some embodiments, the convolution kernel may be shifted by more than one pixel, thus more than one additional column may be included in the next region, but not in the first region. If there is an additional column in the next region, shown as the positive exit from 348, the method may include generating a column histogram for the additional column, as in 344. As illustrated in FIG. 1B, the operations at 348 and 344 may be repeated until column histograms have been generated for all additional columns in the next region. In this example, a histogram for the next region may be represented as the merger of the column histograms corresponding to the next region. For example, the bucket values in each additional column histogram may be added to the corresponding bucket values in the first region histogram to produce a region histogram for the second region having bucket values equal to the sum of the corresponding bucket values of all of the column histograms included in the second region.

Note that in some embodiments, the method for generating the second region histogram may also include removing any column histograms corresponding to columns of pixels that were included in the first region, but are not included in the second region (not shown). For example, the bucket values of a column histogram corresponding to a column of pixels that was included in the first region but is not included in the second region may be subtracted from the corresponding bucket values in the first region histogram. This is described above using the equation:

$$H_{i0+1}(b) = H_{i0} + h_{i0+1}(b) - h_{i0}(b)$$

As illustrated in FIG. 1B, once the region histogram has been computed, the method may include performing a filtering function over the second region using the values of the second region histogram (i.e., the merged column histograms for the second region), as in 352. As described above, the filtering function may be used to produce a result pixel value associated with the second region, in some embodiments.

As illustrated at 356, the method may include determining if there are more regions to filter on the same scan line of the source image (e.g., if the convolution kernel is to be shifted horizontally one or more additional times). If so, indicated as the positive output of 356, the method may include repeating the operations shown as 344-352 for the one or more additional regions, and producing a result pixel value associated with each of the regions. Once there are no more additional regions to filter on the same scan line, shown as the negative exit from 356, the method may proceed as shown in FIG. 1A, beginning at "B", in this example.

As illustrated in FIG. 1A, the method may include determining if there are more regions to filter on the next scan line, as in 360. For example, in some embodiments a convolution kernel may be shifted horizontally (e.g., one pixel to the right) until reaching the end of one scan line, and then may be shifted vertically (e.g., one pixel up) from the last position on the first scan line. In such embodiments, the kernel may then be shifted one position to the left on the second scan line until reaching the beginning of the second scan line, and the operations illustrated in FIG. 1B may be repeated in the opposite direction to produce a result pixel value for each successive region as the kernel is passed horizontally to the left. For example, each time the kernel is shifted to the left, an additional column histogram may be generated and added to the current region histogram, and in some embodiments a column histogram may be computed and/or subtracted from the current histogram, in various embodiments.

If it is determined that there are more regions to filter on a next scan line, shown as the positive exit from 360, the method may in some embodiments continue as illustrated in FIG. 1C, beginning at "C". In this example, a region histogram may be generated for a first region on the next scan line (e.g., for a region included in a convolution kernel shifted one pixel up from a previously filtered region). To compute this region histogram, column histograms may be generated corresponding to the pixels in the columns of the next vertical region, dependent on the values of the pixels in the column. This is shown as 364. In such embodiments, a column histogram in the new region histogram may be generated by adding a pixel value for a pixel included in a column of the new region to the column histogram at the same horizontal position in a previously filtered region. In other words, a value of one of the buckets of a column histogram generated for a previous region may be updated dependent on the value of a pixel in the same horizontal position, but on the scan line above the previous kernel region. In some embodiments, a value of one of the buckets of the column histogram may also be updated dependent on a pixel value for a pixel in the same horizontal position, but on the scan line below the new position of the kernel region.

As illustrated at 368, the method may include determining if there are more columns in the new region for which column histograms should be generated. If so, shown as the positive exit from 368, the operations illustrated at 364 and 368 (and described above) may be repeated for the other columns in the new region. If not, shown as the negative exit from 368, the method may include performing a filter operation on the new region to produce a result pixel value associated with the new region, as in 372. Performing a filter operation on the new region may involve performing the same operations on the column histograms making up the new region that were performed on the column histograms of the first region and/or any additional regions on the first scan line, as described above.

As illustrated in FIG. 1C, the method may include determining if there are more regions to be filtered on the same (i.e., the second) scan line, as in 376. If so, the method may continue as illustrated on FIG. 1B, beginning at "A" and returning to the operations illustrated in FIG. 1A at "B." For example, a convolution kernel may be shifted up by one pixel (as described in FIG. 1C) and then horizontally across the second scan line in much the same manner as it was shifted across the first scan line. Note that in some embodiments, the direction in which the convolution kernel may be shifted horizontally may alternate by scan line, while in others the direction in which the kernel is shifted horizontally may always be the same. For example, in some embodiments, when passing the convolution kernel over regions associated with the second and subsequent scan lines, the kernel may begin on the same edge of the source image as for the first scan line (e.g., the convolution kernel may always begin at the left edge of a new scan line and be shifted horizontally to the right). In such embodiments, an initial region histogram may be generated for the first region on each scan line in the same manner as the region histogram was generated for the first region, or a first region histogram associated each current scan line may be stored in a memory for use in generating the first region histogram on the subsequent scan line before being discarded. Note also that in some embodiments any or all region and/or column histograms may be pre-computed using the methods described herein and stored in a memory for later use in histogram merging as part of various filtering operations. In other embodiments, any or all region and column histograms may be computed during execution of a filtering operation that uses the histogram values. In such embodiments, each column and/or region histogram may be computed only when it is needed, and once computed, it may or may not be stored in memory for later use.

As illustrated in FIG. 1C, once all regions of the source image have been filtered (i.e., once the convolution kernel has been passed over the image for all horizontally and vertical positions of interest), the method may continue as illustrated in FIG. 1A at "D". In this example, the method may include rendering a new image dependent on the result pixel values produced by performing the filtering function on each region as the convolution kernel was passed over it. This is illustrated at 380. For example, if the filtering function performed was a median filter and each result pixel produced represents a median value of the pixels in the region surrounding each input pixel in the original image, a new image may be rendered in which each original pixel is replaced by the result pixel corresponding to the median value for the pixels in a kernel-sized region surrounding the pixel.

Note that in different embodiments, filtering at the far edge of an image may be handled in different ways. For example, a filtering operation that replaces a pixel value with a new value dependent on the values of the pixels surrounding it in a rectangular region may in some embodiments perform its convolutions for a pixel on the far right column as if another column with the same pixel values exists just past the far right edge (e.g., it may assume the presence of another column histogram with the same values as the previous column histogram), or as if another column exits having pixel values that are the average of the values of the corresponding pixels in two or more previous columns for which column histograms have been computed. In other embodiments, filtering operations may use only the available image pixels in the convolution (e.g., ignoring any non-existent columns to the right of the pixel of interest). Other methods of handling histogram-based convolutions at the edges of an input image may be employed in other embodiments.

Figure 2A:
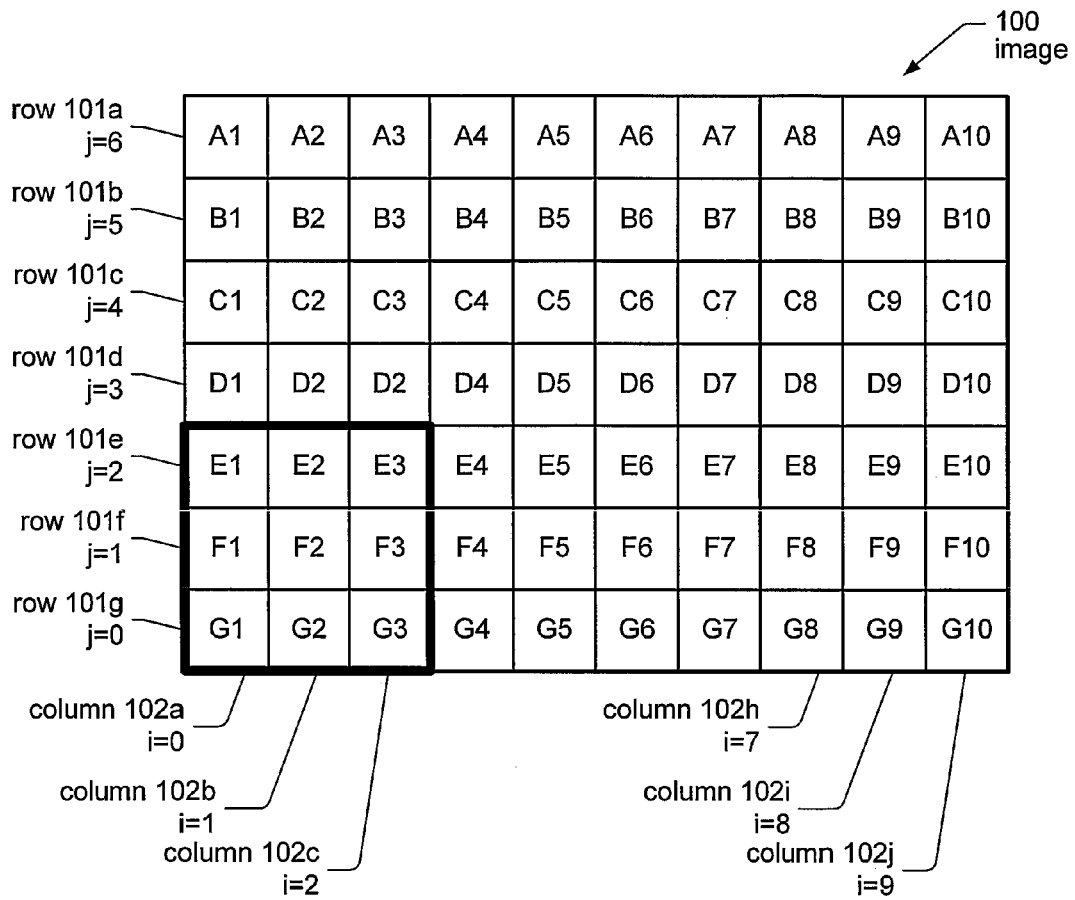
FIG. 2A illustrates an input image, according to one embodiment.
Figure 2B:
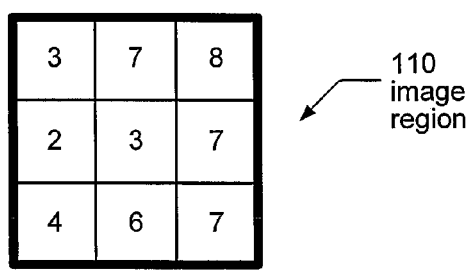
FIG. 2B illustrates pixel values associated with a region of an input image, according to one embodiment.

The methods described above may be further clarified using the examples illustrated by FIGS. 2A-2B, and FIGS. 3-8. FIG. 2A illustrates a source image 100 that includes seven rows 101 of ten pixels each, on which a median filtering operation or another filtering operation may be performed. In this example, a convolution kernel having a width of three pixels and a height of three pixels is shown as a bold outline around pixels E1, F1, G1, E2, F2, G2, E3, F3, G3 in columns 102a-102c and rows 101e-101g. In this example, the values of these pixels (e.g., the values representing a color and/or intensity of these pixels in input image 100) are as illustrated in image region 110, shown in FIG. 2B. In this example, the value of pixel G1 is 4, the value of pixel F1 is 2, the value of pixel E1 is 3, and so on.

In this example, a histogram of image region 2B may in some embodiments include 256 buckets corresponding to 8-bit color values ranging from 0-255, where each bucket may be indexed by a corresponding index value. Each bucket value may correspond to a count of the number of pixels having the same value as the index value. Note that in other embodiments, column and/or region histograms may have values corresponding to a sum of weights or a weighted count of pixels, or may be dependent on pixel values in another way. In this example, the bucket having index 0 may be used to count the number of pixels in the region having the color value 0, the bucket having index 1 may be used to count the number of pixels in the region having the color value 1, and so on. In this example, a region histogram for image region 110 may include a bucket2 having a value of 2 (since only one pixel has the value 2), a bucket3 having a value of 2 (since two pixels have a value of 2), a bucket4 having a value of 1, a bucket6 having a value of 1, a bucket7 having a value of 3, a bucket8 having a value of 1, and all other buckets having indexes between 0-255 (other than those listed) having a value of 0 (since no pixels in the region have those values).

The median value of the pixels in image region 110 may be determined by searching the region histogram to find the pixel value greater than half the population. In this example, there are nine pixel values: 2, 3, 3, 4, 6, 7, 7, 7, and 8. Thus, the median value is 6. This may be determined using the region histogram by starting at the first bucket and adding up the values in each bucket until half of the pixels in the region are accounted for. In other words, the method may include looking at the value of bucket0 (0), and adding the values of each successive bucket until the total exceeds one half of the number of pixels (i.e., until the total equals 5, in this example). In this example, the values of bucket0 (0), bucket1 (0), bucket2 (1), bucket3 (2), bucket4 (1), bucket5 (0), and bucket6 (1) may be added together to reach a total of 5. The last bucket (bucket6) corresponds to a pixel value of 6, which is the median pixel value.

The methods illustrated in FIGS. 1A-1C for performing various filtering operations using region histograms incrementally built from column histograms may further explained using the examples below. FIG. 3 illustrates an image 100, which may be the same image depicted in FIG. 2A or may be a different image. In this example, a convolution kernel is shown as a bold outline around pixels D4, E4, F4, D5, E5, F5, D6, E6, F6, on rows 101d-101f, and in columns 102d-102f.

As described above, a region histogram for this region may be computed as the merger of column histograms representing the columns of pixels in the region. This is illustrated in FIG. 4. In this example, the region outlined in bold may be represented by three column histograms. The first column histogram may be dependent on the pixel values of the three pixels in column 102d having column index i=3, and row indexes of j=1, j=2, and j=3, the second may be dependent on the pixel values of the three pixels in column 102e (having column index i=4, and row indexes of j=1, j=2, and j=3), and the third may be dependent on the pixel values of the three pixels in column 102f having column index i=3, and row indexes of j=1, j=2, and j=3, respectively. Column histograms may be generated for each of these columns of pixels as described above. For example, the values in a column histogram may represent a count or weighted count of pixels in the column having a given pixel value (e.g., a value equal to the bucket value), or a sum of weights, in various embodiments. These column histogram values may be merged to produce a region histogram for the kernel region and may be used to perform a filter operation on this region of image 100, as described herein. For example, a median value may be produced for the region outlined in bold and the result pixel value may replace the pixel value in the center of the kernel (e.g., the value of E5, having indexes i=4 and j=2) in a filtered output image.

Figure 5:
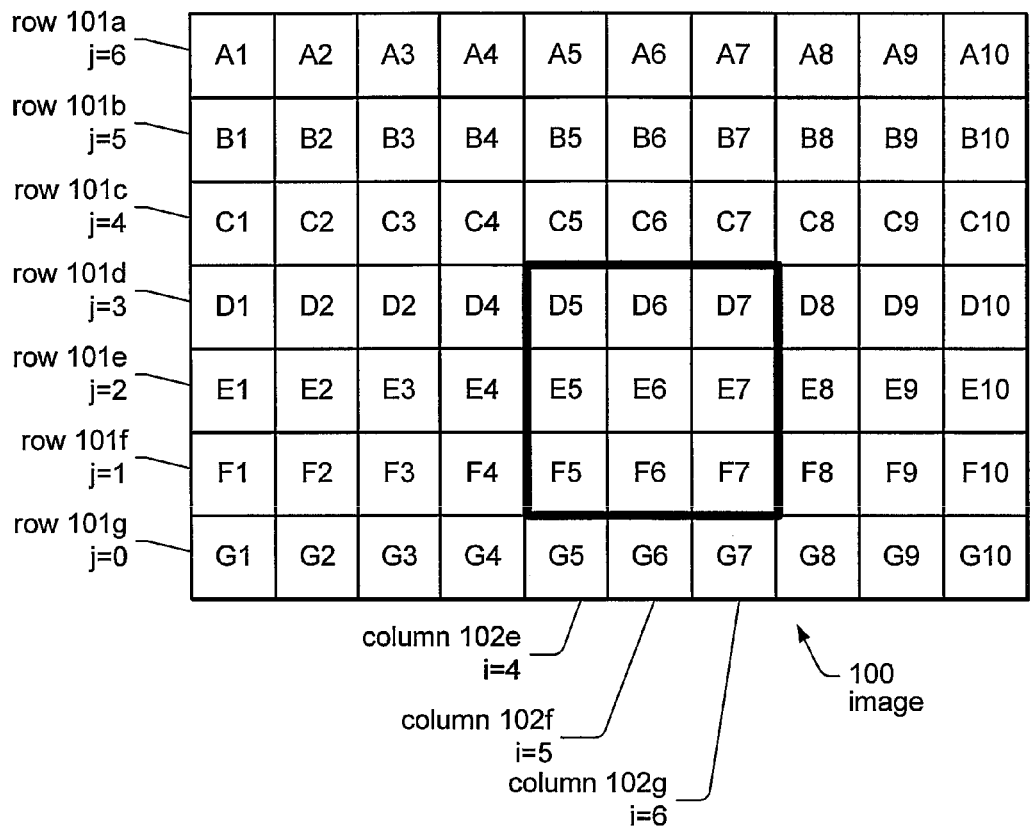

As described above, in some embodiments, filtering of an image 100 may involve passing a convolution kernel over an image by shifting it horizontally and/or vertically, and performing the filtering function on each successive region of the image to produce result pixel values for a filtered output image. FIG. 5 illustrates that the convolution kernel shown in FIG. 4 has been shifted one pixel to the right. The new region, outlined in bold, now includes the pixels D5, E5, F5, D6, E6, F6, G4, G5, and G6 on rows 101d-101f and in columns 102e-102g. A region histogram for this new region may be computed by merging three column histograms, in this example. The first column histogram may be dependent on the pixel values of the three pixels in column 102e having column index i=4, and row indexes of j=1, j=2, and j=3, the second may be dependent on the pixel values of the three pixels in column 102f having column index i=5, and row indexes of j=1, j=2, and j=3, and the third may be dependent on the pixel values of the three pixels in column 102g having column index i=6, and row indexes of j=1, j=2, and j=3, respectively.

As illustrated in FIG. 6, the new region includes two of the columns of pixels that were included in the previous region, plus one additional column of pixels (in column 102g). As described above, a region histogram for this region may in some embodiments be computed in part by generating a column histogram for the three pixels in column 102g. This new column histogram may then be merged with the region histogram of the previous region, and the column histogram for the three pixels in column 102e that are no longer included in the region (shown outlined with a dashed line) may be removed from the previous histogram to generate a region histogram for the new region outlined in bold in FIGS. 5 and 6. For example, the values in the buckets of the new column histogram may be added to the corresponding buckets of the previous region histogram and the values in the buckets of the column 102d histogram may be subtracted from the corresponding buckets of the previous region histogram to generate the region histogram for the new region. The new region histogram values may in some embodiments be used in performing various filtering operations on this region of image 100, as described herein.

FIG. 7 illustrates a case in which the convolution kernel is shifted vertically, rather than horizontally from its position in FIG. 4. In this example, the new region, now outlined in bold, includes the pixels C4, D4, E4, C5, D5, E5, C6, D6, and E6 on rows 101e-101g and in columns 102d-102f. A region histogram for this new region may be computed by merging three column histograms, in this example. The first column histogram may be dependent on the pixel values of the three pixels in column 102d having column index i=3, and row indexes of j=2, j=3, and j=4, the second may be dependent on the pixel values of the three pixels in column 102e having column index i=4, and row indexes of j=2, j=3, and j=4, and the third may be dependent on the pixel values of the three pixels in column 102f having column index i=5, and row indexes of j=2, j=3, and j=4, respectively. These columns of pixels in the new region are outlined in bold in FIG. 8.

Figure 8:
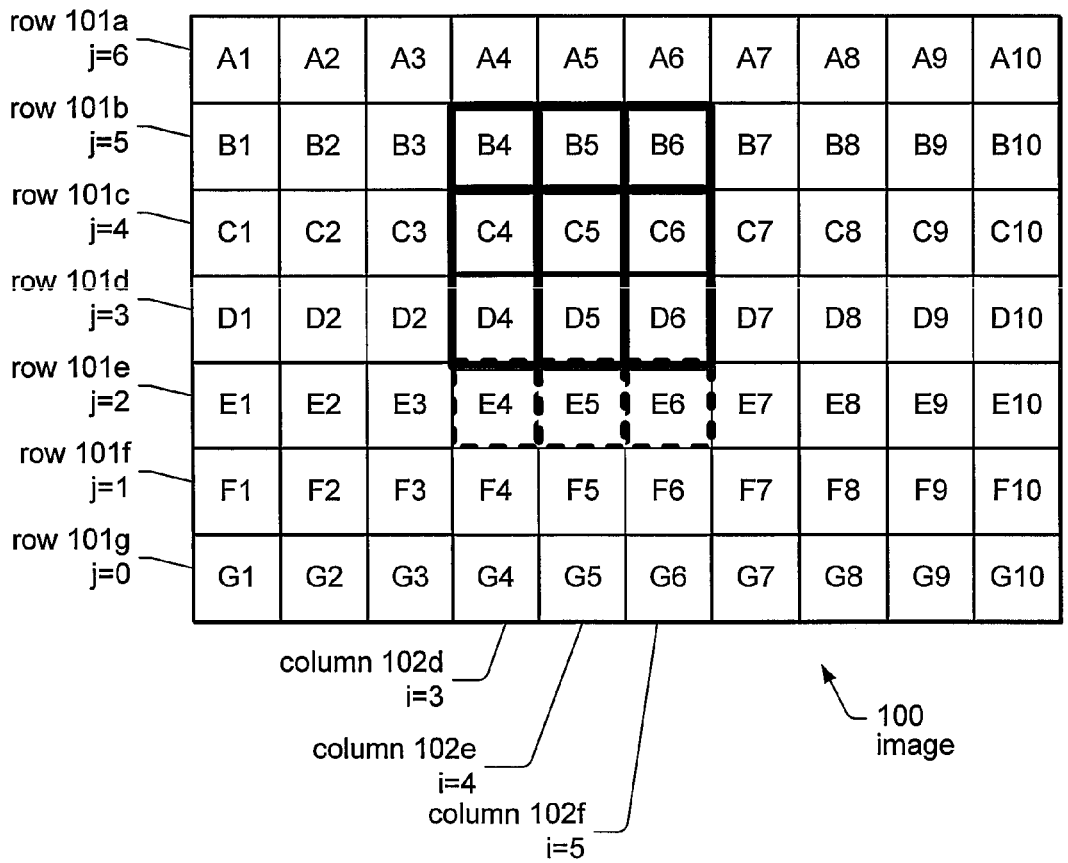

As illustrated in FIG. 8, each column of the new region includes an additional pixel not included in the previous region (pixels C4, C5, and C6, in columns 102d, 102e, and 102f, respectively) and does not include one pixel that was included in the previous region (pixels F4, F5, and F6, in columns 102d, 102e, and 102f, respectively). To compute the three column histograms for this new region, each of the column histograms of the previous region may be updated to include the value of the additional pixel on row 101c and to remove the value of the pixel on row 101f, in this example. In other words, for a pixel from the next scan line up in a column i with value b, the corresponding bucket value $h_i(b)$ may be incremented, and for the pixel in column i on the scan line now below the vertical range of the kernel with a value b', $h_i(b')$ may be decremented. In the example illustrated in FIG. 8, the bucket value $h_3(b)$ corresponding to the value b of pixel C4 (which is now included in the region) may be incremented and the bucket value $h_3(b')$ corresponding to the value b' of pixel F4 (which is not included in the new region) may be decremented for the column histogram of the new region having index i=3. Similar updates may be made to the column histograms of the new region having indexes of i=4 and i=5, in this example. The resulting column histograms may in some embodiments be merged to produce a region histogram for the new region on which a filtering operation may be performed.

The operations illustrated in these examples may in some embodiments be repeated as the convolution kernel is shifted horizontally and/or vertically over image 100, as described above, to produce result pixel values corresponding to each region for use in rendering a filtered output image.

A variation of the method described above may in some embodiments require doing a little more work when moving from scan line to scan line, but may involve less work in merging the resulting histograms. In such embodiments, for a pixel from the next scan line up in a column i with value b, the corresponding bucket value $h_i(b)$ may be incremented as described above, but in addition, a corresponding bucket value in a remote column histogram may be decremented. For example, the bucket value $h_{i+Dx}(b)$, where $D_X$ is the width of the kernel, may be decremented. Similarly, for the pixel in column i on the scan line now below the vertical range of the kernel with a value b', $h_i(b')$ may be decremented and $h_{i+Dx}(b')$ may be incremented. In the example illustrated in FIG. 8, the bucket value $h_3(b)$ corresponding to the value b of pixel C4 (which is now included in the new region) may be incremented and the bucket value $h_6(b)$ corresponding to the value b of pixel C4 may be decremented (since the value of $D_X$ is 3, in this example). Similarly, the bucket value $h_3(b')$ corresponding to the value b' of pixel F4 (which is not included in the new region) may be decremented and the bucket value $h_6(b')$ corresponding to the value b' of pixel F4 may be incremented, in this example.

This variation may in some embodiments include two additional operations per pixel over the method described above when shifting the kernel vertically, but may have the effect of reducing the amount of work required to combine histograms when shifting the kernel horizontally across the image. For example, in such embodiments, the equation for computing a new region histogram from a previous region histogram when moving one pixel horizontally may be given as:

$$H_{i0+1}(b) = H_{i0} + h_{i0+1}(b)$$

As shown in the equation above, in embodiments employing this variation, the method may include computing a new region histogram by merging a previous region histogram with an additional column histogram, without having to subtract a column histogram. Instead, the additional operations performed when computing each column histogram may result in each column histogram representing a difference between histograms rather than the column histogram merely being dependent on pixel values in the current column. In some such embodiments, column histograms (e.g., column histograms including negative values) may be computed for one or more columns past the far edge of the input image, and may be used by various filtering techniques to produce filtered output values for the pixels in one or more of the last columns of the input image. For example, if the convolution kernel has a width of 2R pixels, an additional 2R−1 column histograms may be computed corresponding to non-existent columns of pixels in the input image. These additional column histograms may correspond to column indexes beginning at 2R (i.e., just past the far edge of the input image). Similarly, in some embodiments, column histograms may be generated corresponding to 2R−1 additional columns with index values beginning at a horizontal position of −2R+1 before the leading edge of the input image.

Spatially-Varying Histogram Convolution

As mentioned previously, box-bilateral filtering may in some embodiments be expressed as a function of a region histogram due to the fact that weights may only depend on the value of the pixels (e.g., the color and/or intensity) and not on the position of the pixel within the region. An alternative methodology may include a weighting function that depends on spatial location of the pixels in a region as well as on their pixel values. In some such embodiments, a filtering function may be dependent on the ratio of a weighting function $w^S_C$ that is dependent on both pixel location and pixel value, and a weighting function $w^S$ that is dependent only on pixel location. For example, in one embodiment, the weightings and filter function may be defined as:

$$w^S = \sum_{i,j} W_S(I[i,j], I_C, i, j)$$

$$w^S_c = \sum_{i,j} W_S(I[i,j], I_C, i, j)I[i,j]$$

$$F^S = \frac{wS_c}{wS}$$

As in similar equations describing weighting functions described herein, I[i,j] may represent the pixel value at the pixel indexed by the given values of i and j, and $I_C$ may in some embodiments represent the value of a center pixel for a given region. In some embodiments, the spatial weighting function may be an exact or approximate Gaussian function of spatial coordinates. In some embodiments, the spatial weighting function may be a separable spatial function, i.e. the product of vertical and horizontal weighting functions, as in these examples:

$$w^S = \sum_{i,j} W(I[i,j], I_C)G_H(i-i0)G_v(j-j0)$$

$$w^S_c = \sum_{i,j} W(I[i,j], I_C), G_H(i-i0)G_v(j-j0)I[i,j]$$

$$F^S = \frac{wS_c}{wS}$$

In some embodiments, a method for computing a spatially varying bilateral filter may include the generation of a vertically-weighted histogram $h_i^V$ for each column of pixels I and then performing a horizontal convolution using those histograms. In such embodiments, a scatter operation $S^V(i, i, j0, j1)$ may be defined using the following pseudo-code example:

```
For each j from j0 to j1
{
    h_i^V[I(i,j)] += Gv(j-j0)
}
```

In this example, the cost to compute $h_i^V$ may be linear with the vertical size of the kernel. In such embodiments, the two-dimensionally weighted convolution may be computed using:

$$H^S(b) = \sum_{i=i0}^{i=in} h_{iV}(b)G_H(i-i0)$$

The cost for this convolution may in some embodiments be linear with the horizontal size of the kernel times the number of buckets. However, for a particular value of b, a horizontal convolution may in some embodiments be computed of the $h_i^V$ values for bucket index b. In such embodiments, the weighting function $G_H()$ may be chosen to be a convolution that can be computed by one or more successive box filters (such as a triangular filter or piece-wise quadratic approximation to a Gaussian function). In this example, if an additional set of memory is used to store horizontally convolved histograms, the convolution $H^S(b)$ may be computed in constant time through successive application of constant cost box filters to each bucket entry. The total cost of this method may in some embodiments be linear in performance with the vertical resolution of the kernel and may include a storage requirement of two histograms per column. For example, the cost may in some embodiments be defined as:

$$c=A_W D_Y + BN_C$$

In this example, $A_W$ may represent the cost of atomic weighted scatter, B may represent the number of buckets, and $N_C$ may represent the cost of applying a constant cost box convolution to a bucket entry N times. In some embodiments, this approach may include a storage requirement M as follows:

$$M=2I_x B+I_x I_y$$

In some embodiments, the number of buckets B may be reduced by using weighting functions that are broad in the pixel value space (e.g., color weighting functions that are broad in color space), and sub-sampling the values (e.g., color levels) when building the histograms. Such histogram quantization may in some embodiments be used to improve performance of the methods described herein.

As described herein, certain image processing techniques (e.g., for image filtering) may involve the merging of histograms that represent populations of pixels. Merging histograms (such as adding one histogram to another) may be used in a variety of image processing techniques that build composite histograms by the addition and subtraction of other histograms. For example, using the methods described above, column histograms may be added to or subtracted from region histograms to generate new region histograms when performing a convolution over an image. Typically, such merging is done by looping through the entries in each histogram and applying a pair-wise operation to the entries. Traditionally, this technique may have a cost that is linear with the number of entries in the histograms. For sparse histograms, however, many of the bucket entries may have a value of 0 (i.e., many of the buckets in the histogram may be empty). Such sparsity may arise when the number of buckets in a histogram is much greater than the number of pixels being represented, or when many pixels in a given region have the same value, in different embodiments.

If one of two histograms being merged is sparse (e.g., if it has many entries with a value of 0 and/or empty buckets), a technique that performs a merging function on every pair of histogram entries may perform unnecessary work. In some embodiments, merging of histograms may be implemented efficiently by keeping track of those portions of a histogram (e.g., particular buckets) that contain all zeros, and performing a merge operation only when the value of the corresponding bucket in the histogram to be merged with an initial histogram is non-zero.

A method for sparse histogram merging may in some embodiments involve the use of a hierarchical acceleration data structure to keep track of empty and/or non-zero entries in a histogram. In some embodiments, a block structure may be implemented in which each entry in the acceleration data structure represents a block of N pixel values (e.g., where N is a power of 2). Each time an entry in the histogram is modified, the non-zero entry count corresponding to the block of pixel values including that pixel value may be updated. For example, in some embodiments, updating the entry when a histogram entry is changed may include testing the entry before changing it to see if it was 0, incrementing the block non-zero count if it was not, testing the entry after the change to see if it has become 0, and decrementing the non-zero entry count if it has. In some embodiments, when merging two histograms, blocks of pixel values may be skipped (i.e., the merge operation for the buckets corresponding to those pixel values may not be performed) if the buckets contain all zeros (i.e. have a non-zero count of 0), for merge operations such as addition or subtraction, where adding or subtracting 0 will not change the value in the original histogram entry.

A method for merging sparse histograms may be illustrated by way of the following examples. In these examples, two histograms (H1 and H2) include B buckets each. Each of the entries in each histogram may have a whole number value (e.g., corresponding to a count of pixels), or may have a fractional value (e.g., representing sums of spatial weights, or weighted counts). For simplicity, the examples described herein include whole number histograms. However, the methods may also be applied to histograms in which the entries include fractional values. The counts may all be positive, or may include both positive and negative values, in different embodiments. For example, a count may be negative when a histogram represents the difference between populations for two or more regions, as described above.

In a first example, a new histogram H3 may be computed that is the sum of histograms H1 and H2. Using a traditional, brute-force method, the new histogram may be generated as shown in the following pseudo-code:

For I=0 to B−1

$$H3[i]=H1[i]+H2[i]$$

Using this method, the cost to compute H3 is equal to B times the cost of the inner computation (i.e., B times the cost of the merger of each bucket).

In a second example, H1 may be densely populated. That is, many entries (e.g., the majority of entries), may be non-zero. In this example, H2 may be sparsely populated. If H2 includes only N non-zero values, then H3 may be computed as shown in the following pseudo-code example:

For each non-zero value entry of H2 at j $$H3[j]=H1[j]+H2[j]$$

This method may have a cost that is N times the cost of the inner loop, where N may be significantly smaller than B for a sparse histogram. In some embodiments, an upper bound on N may be the number of pixels represented by the histogram. When merging histograms that represent columns of pixels, sparse histogram merging, as described herein, may have a worst-case cost that is linear with the kernel size.

In some embodiments, to use the technique, a list of values j for which H2[j] is non-zero may be maintained. Such a list may be updated as new elements are added to and subtracted from the histogram. In some embodiments, a sparse histogram may be represented using a hierarchical structure, rather than using a single list of non-zero values. For example, H[b] may be maintained as a normal histogram, and a second array C[ ] may also be maintained. Each entry in C[ ] may store the number of non-zero entries in a set of R entries in H.

For example, if R=1<<rBits (i.e., if R is a power of 2), when incrementing a bucket in the histogram for index b, a number of non-zero entries corresponding to the set of histogram entries (e.g., buckets) including the bucket for index b may be decremented if the previous value was −1, and the number of non-zero entries corresponding to that set of histogram entries may be incremented if the previous value was 0. Otherwise the number of non-zero entries does not change when the histogram entry is incremented. This may be illustrated using the following pseudo-code example:

```
if H[b]== −1
{
    C[b >> rBits]−−;
}
else if H[b] == 0
{
    C[b >> rBits]++;
}
H[b]++;
```

For example, using the method described above, if rBits=3, then R=8, and each value in C[ ] represents a count of non-zero entries corresponding to 8 buckets of the histogram. In other words, C[0] may represent a count of non-zero entries for buckets with indexes 0-7, C[1] may represent a count of non-zero entries for buckets 8-15, and so on.

Using the same assumptions as above, when decrementing a bucket in the histogram with index b, the number of non-zero entries corresponding to the set of histogram entries (e.g., buckets) including the bucket for index b may be decremented if the previous value was 1, and the number of non-zero entries corresponding to that set of histogram entries may be incremented if the previous value was 0. Otherwise the number of non-zero entries does not change when the histogram entry is decremented. This may be illustrated using the following pseudo-code example:

```
if H[b] == 1
{
    C[b >> rBits]−−;
}
else if C[b] == 0
{
    C[b >> rBits]++;
}
H[b]−−;
```

Figure 9:
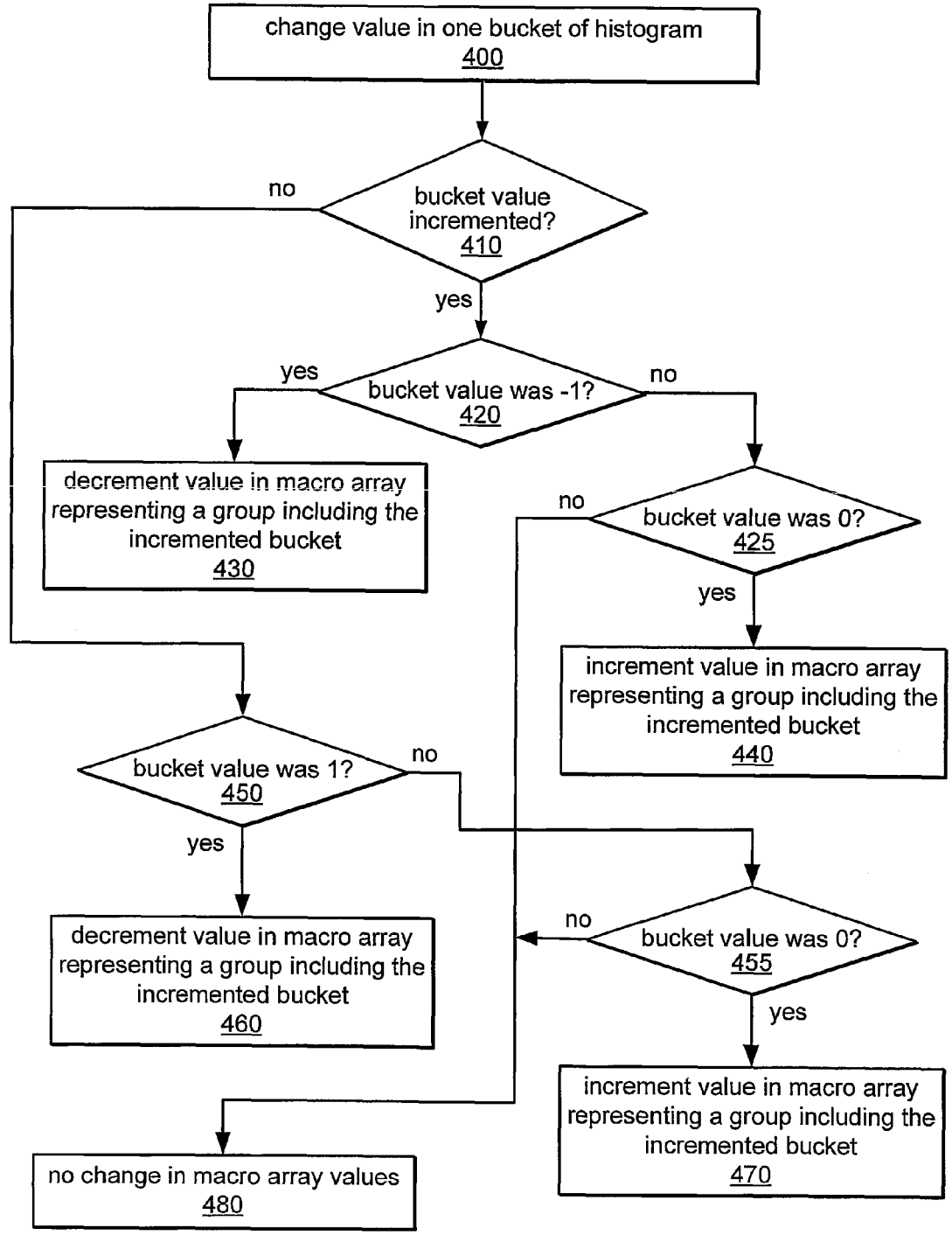
FIG. 9 illustrates a method for maintaining an array indicating non-zero values in a histogram, according to one embodiment.

The method described above may be further illustrated using the flow chart depicted in FIG. 9. In this example, it is assumed that a macro array, such as C[ ] above, is initialized so that the value of each entry represents a number of non-zero entries in a group of buckets of an image histogram. As illustrated at 400, a change may be made to one bucket in a histogram. For example, if new elements are added to or removed from an image (e.g., when executing a graphics application or image processing application), the value of a histogram associated with a group of pixels (e.g., a column histogram or region histogram, as described herein) may be updated to reflect any changes in the pixel values of one or more pixels in the image.

As illustrated in FIG. 9, the method may include determining if the change included the bucket value being incremented, as in 410. If so, shown as the positive exit from 410, the method may include determining if the previous value was −1, as in 420. If the previous value was −1, shown as the positive exit from 420, the method may include decrementing the macro array value corresponding to a group of bucket index values that includes the bucket index of the bucket value that was incremented, as in 430. In other words, if the previous value was −1 (a non-zero value) and it was incremented (giving it a value of 0), the non-zero count associated with the bucket (e.g., with a group of buckets including the bucket) may be decremented to reflect that there are now fewer non-zero values in this group of buckets.

If the previous value of the incremented bucket value was not −1, shown as the negative exit from 420, the method may include determining if the previous value was 0, as in 425. If the previous value was 0, shown as the positive exit from 425, the method may include incrementing the macro array value corresponding to a group of bucket index values that includes the bucket index of the bucket value that was incremented, as in 440. In other words, if the previous value was 0, but it was incremented, the new value is non-zero, and the non-zero count for the corresponding group of buckets may be incremented. If the previous value of the incremented bucket was neither −1 or 0 (i.e., it was a non-zero value other than −1), shown as the negative exit from 425, the method may include no change to the corresponding macro array value, since this value was already counted as a non-zero value and remains a non-zero value. This is shown in 480.

If the changed bucket value was not incremented, shown as the negative exit from 410, the bucket value may have been decremented. In the example illustrated in FIG. 9, if the bucket value was decremented, the method may include determining if the previous bucket value was 1, as in 450. If the previous value was 1, shown as the positive exit from 450, the method may include decrementing the macro array value corresponding to a group of bucket index values that includes the bucket index of the bucket value that was decremented, as in 460. In other words, if the previous value was 1 (a non-zero value) and it was decremented (giving it a value of 0), the non-zero count associated with the bucket (e.g., with a group of buckets including the bucket) may be decremented to reflect that there are now fewer non-zero values in this group of buckets.

If the previous value of the decremented bucket value was not 1, shown as the negative exit from 450, the method may include determining if the previous value was 0, as in 455. If the previous value was 0, shown as the positive exit from 455, the method may include incrementing the macro array value corresponding to a group of bucket index values that includes the bucket index of the bucket value that was decremented, as in 470. In other words, if the previous value was 0, but it was decremented, the new value is non-zero, and the non-zero count for the corresponding group of buckets may be incremented. If the previous value of the decremented bucket was neither 1 or 0 (i.e., it was a non-zero value other than 1), shown as the negative exit from 455, the method may include no change to the corresponding macro array value, since this value was already counted as a non-zero value and remains a non-zero value. This is shown in 480.

Note that the flow chart described above is merely illustrative. For example, the steps may be performed in a different order or combined (e.g., using intrinsic instructions on some processors/machines). In one embodiment, a bucket value may be considered before and/or after change to determine if a corresponding macro array value should be incremented, decremented, or left unchanged. Fractional values or weights may also be taken into account.

In some embodiments, if a non-zero block count array is maintained for one of two histograms to be merged, as described above, a corresponding histogram merging method may be illustrated using the following pseudo-code example:

```
nBase = 0
while(nBase < B)
{
    If (C[nBase >> rBits] != 0)
    {
        nMax = nBase + R−1
        For i = nBase to nMax
            H3[i]=H1[i] + H2[i]
    }
    nBase += R;
}
```

For example, using the method described above, if rBits=3, then R=8, and each value in C[ ] represents a count of non-zero entries corresponding to 8 buckets of the histogram. In this example, it is assumed that C[0] represents non-zero counts for histogram H2. The first iteration of the inner loop may examine the value of C[0] to see if it is non-zero. If so, the bucket values in histograms H1 and H2 may be merged for buckets having indexes 0-7 to produce the value for H3. If C[0] is 0, however, these bucket values need not be merged and the corresponding bucket values for H3 may be the same as those for H1. The second iteration may perform the same testing and/or merging for C[1] and the bucket values having indexes 8-15, in this example. The inner loop may be repeated until B buckets (i.e., buckets having an index up to bucket index B−1) have been accounted for.

The inner loop shown in this example may in some embodiments be unrolled R times and parallel instructions may be used to perform multiple additions at once. For example, in some embodiment, instructions implementing the operations of the inner loop may be executed in parallel on one or more Graphics Processing Units (GPUs) configured to perform such operations in parallel.

Figure 10:
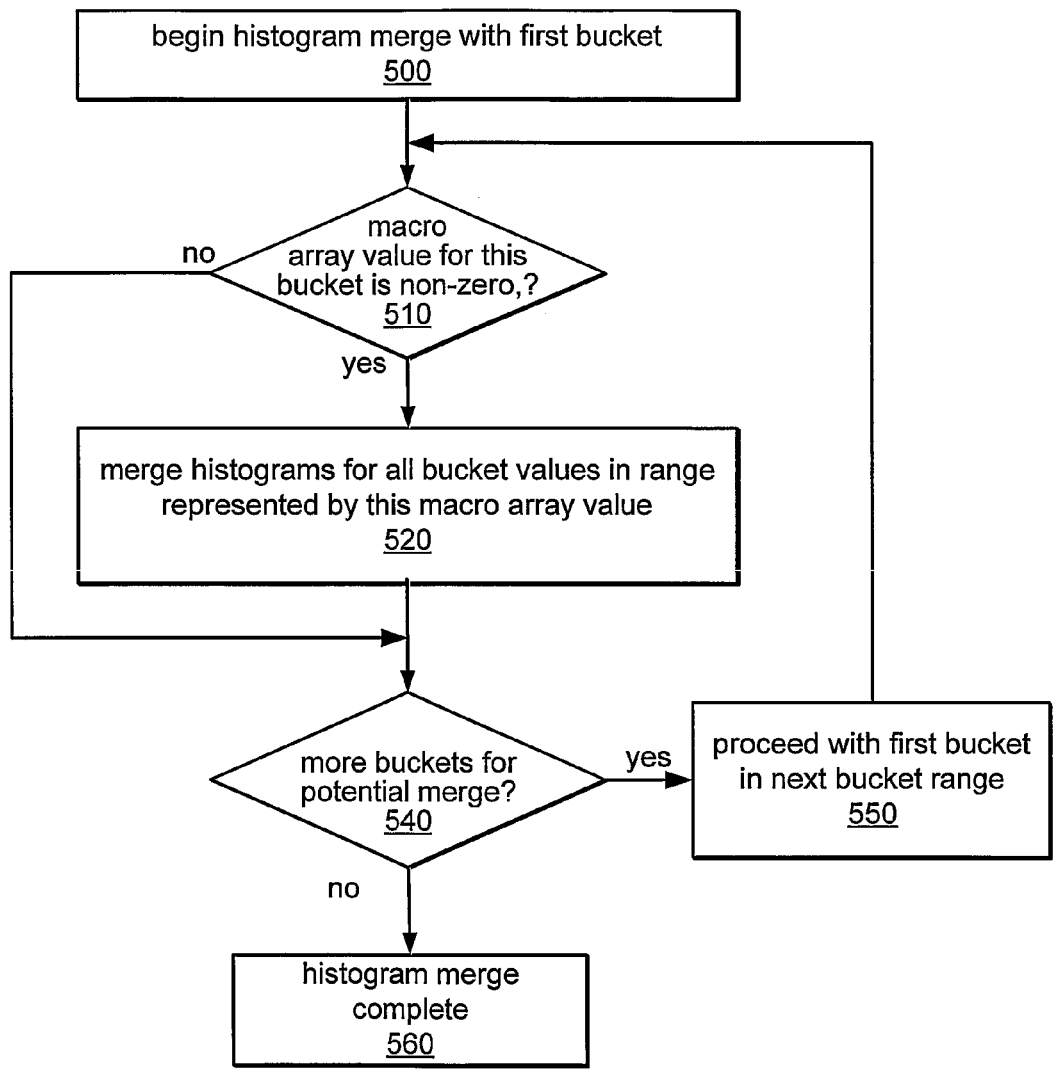
FIG. 10 illustrates one embodiment of a method for performing sparse histogram merging using an array indicating non-zero values one of the histograms.

The methods described above may be further illustrated by the flow chart depicted in FIG. 10. In this example, the merging of two histograms H1 and H2 may begin at the first bucket index value (e.g., bucket index 0), as in 500. In this example, it is assumed that a macro array C[ ] may be initialized and maintained whose entries represent the number of non-zero entries in each group of eight buckets in histogram H2. The method may include determining if the macro array value corresponding to a bucket group that includes the first bucket is non-zero, as in 510. In other words, the method may include determining if all of the buckets in this group have values of 0 or if any of them has a value that is non-zero. If the macro array value for the group of buckets is non-zero, shown as the positive exit from 510, the method may include merging the histograms of H1 and H2 for all of the bucket values in the range represented by the macro array value (for eight buckets, in this example). This is illustrated at 520.

On the other hand, if the macro array value associated with this bucket group is 0, shown as the negative exit from 510, all of the bucket values with indexes in the corresponding range are 0. In this case, the method may include not merging the bucket values of H1 and H2 for any of the buckets in this bucket group (i.e., the operation illustrated at 520 may be skipped for the buckets in this group and the corresponding bucket values of H3 may be the same as those of H1).

As illustrated in FIG. 10, the method may include determining if there are more buckets that may potentially be merged, as in 540. If there are more buckets that may potentially be merged, shown as the positive exit from 540, the method may include proceeding with the first bucket in the next bucket range, as in 550. In this example, since each macro array value represents a non-zero count associated with a group of eight buckets, the first bucket in the next bucket group may be the ninth bucket (e.g., a bucket with a bucket index of 8). The method may include repeating the operations illustrated at 510-540 for each bucket group until all the buckets in groups with non-zero macro array values have been merged.

Once all buckets have been merged or skipped (depending on their corresponding macro array values), illustrated as the negative exit from 540, the histogram merging may be complete, as in 560.

The methods for merging sparse histograms described herein may be applied to the merging of region histograms and column histograms, as described in detail above. For example, a new column histogram may be added or subtracted from a region histogram to generate a new region histogram. The region histogram and/or the column histogram may be sparsely populated histograms, in some embodiments. Therefore, the methods described above may in some embodiments be efficiently implemented by the generation and use of an acceleration data structure, or macro array, to maintain an indication of the number and/or location of non-zero histogram entries of one or both of the histograms and only merges the bucket values corresponding to non-zero entries of one of the histograms.

In some embodiments, the methods described above may be extended to a multi-level hierarchy. For example, in one embodiment, an additional array M[ ] may be used to store the sum of a set of R entries in the array C[ ], and so on.

Using the non-zero block count method described above, an efficiency gain may in some embodiments only occur when a block of histogram entries are all 0. In embodiments that include a variation on this method, a finer-grained form of sparsity may be identified and taken advantage of. In such embodiments, a bit mask may be used to represent the entries that have non-zero values, and may be used to implement a more fine-grained merge that may be more efficient.

In some embodiments, instead of macro array C[ ] being used to store a number of non-zero entries for a group of bucket values, a bit mask may be used to record which entries in the group are non-zero. The bit mask may then be used to accelerate histogram merging for a block of bucket values even if some of the entries are non-zero. This alternate method is illustrated in the following pseudo-code example. Again, R may be chosen such that R=1<<rBits, and a bit mask rMask may be defined such that rMask=R−1. In other words, the number of bits in the bitmask may be equal to the number of buckets represented by each entry of the macro array, with each bit corresponding to a particular one of the buckets in the group.

In some embodiments, on incrementing a bucket in the histogram for index b, the macro array values may be updated as illustrated in the following pseudo-code example:

```
If H[b] == −1
{
    C[b >> rBits] &= ~(1 << (b & rMask)); // Set the bit to 0
}
else if H[b] == 0
{
    C[b >> rBits] |= (1 << (b & rMask)); // Set the bit to 1
}
H[b]++;
```

As shown by the pseudo-code above, this method may be very similar to the previously described method for maintaining a macro array to accelerate histogram merging. However, in this example, rather than incrementing or decrementing a count when a bucket value changes from 0 to a non-zero value (or vice versa), a bit in the bit mask corresponding to the particular bucket in the group may be set to 1 or 0, or may not change, depending on the change in a histogram bucket value. For example, if the previous value was −1 and is incremented so that it is 0, the corresponding bit in the mask bit may be set to 0 to indicate that the bucket value is now 0. If the previous value was 0 and is incremented so that it is 1, the corresponding bit in the mask bit may be set to 1 to indicate that the bucket value is now non-zero. For example, if each macro array entry represents 8 bucket values, an 8-bit bit mask may be stored in each entry. In the example above, if the value of the third bucket in a bucket group changes (e.g., one having a relative bucket index of 2), the bit in the third position in the bit mask (e.g., the third least significant value) may be set to 1 or 0 (or left alone) depending on the previous and new values of the bucket.

Similarly, on decrementing a bucket in the histogram for index b, the bit in the bit mask stored in the corresponding macro array entry may be updated depending on its previous value, as follows:

```
If H[b] == 1
{
    C[b >> &= ~(1 << (b & rMask));  // Set the bit to 0
}
else if C[b] == 0
{
    C[b >> rBits] |= (1 << (b & rMask));  // Set the bit to 1
}
H[b]--;
```

In other words, the bit in the bit mask corresponding to a bucket whose value has changed may be set to 1, set to 0, or left alone depending on the previous value of the newly decremented bucket value. Note that the flow chart described above is merely illustrative. For example, the steps may be performed in a different order or combined (e.g., using intrinsic instructions on some processors/machines). In one embodiment, a bucket value may be considered before and/or after change to determine if a corresponding macro array value should be incremented, decremented, or left unchanged. Fractional values or weights may also be taken into account. Also, in an alternate embodiment, setting and clearing individual bits of a word of the bit mask may be accomplished using intrinsic instructions on some processors/machines.

Figure 11:
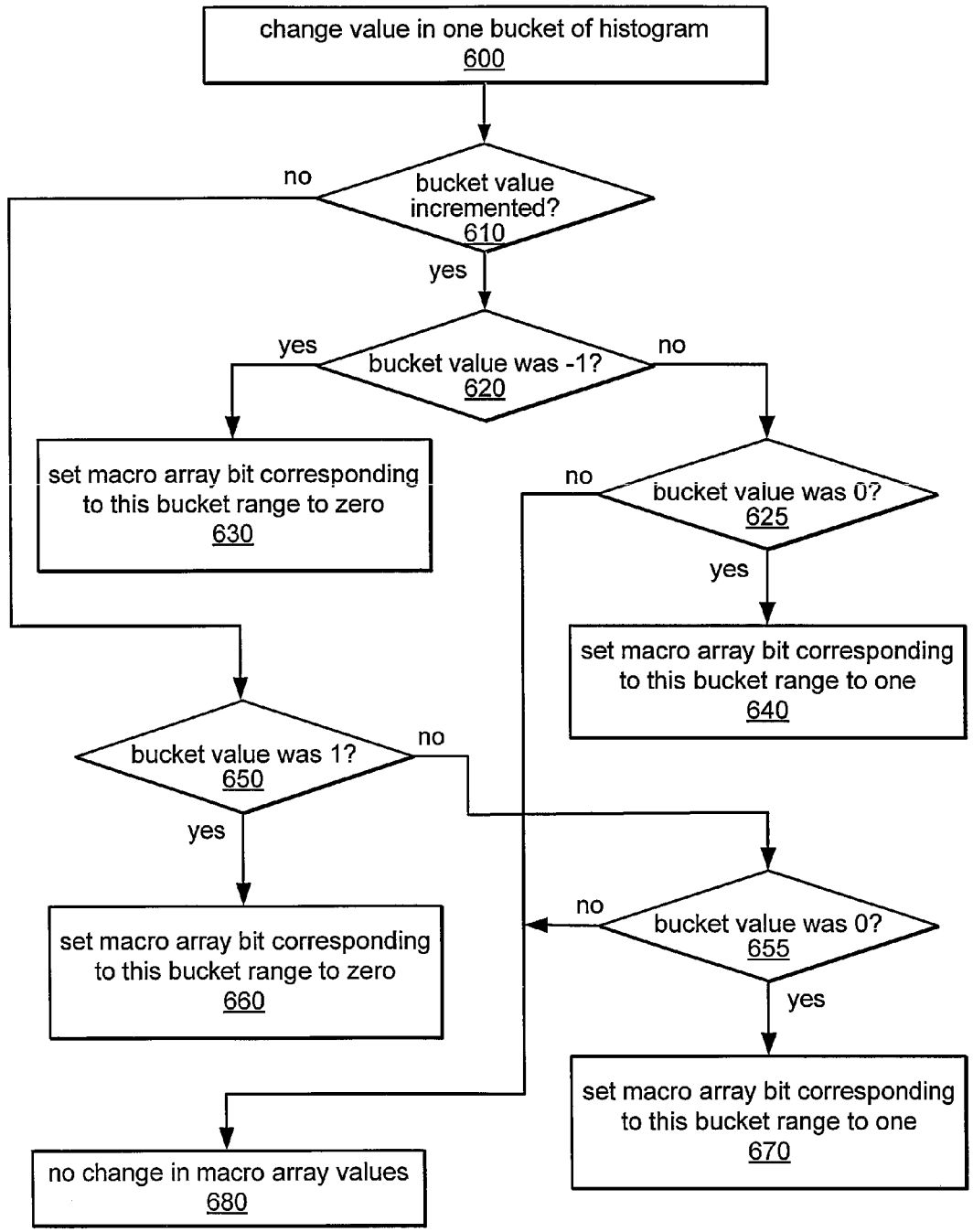
FIG. 11 illustrates a method for maintaining an array of bitmasks indicating non-zero values in a histogram, according to one embodiment.

The methods described above may be further illustrated by the flow chart depicted in FIG. 11. In this example, it is assumed that a macro array, such as C[ ] above, is initialized so that the value of each entry represents a bitmask for a group of bucket values, and so that each bit in the bitmask indicates whether a particular bucket value in an image histogram is 0 or non-zero. As illustrated at 600, a change may be made to one bucket in a histogram. For example, if new elements are added or removed from an image (e.g., when executing a graphics application or image processing application), the value of a histogram associated with a group of pixels (e.g., a column histogram or region histogram, as described herein) may be updated to reflect any changes in the pixel values of one or more pixels in the image.

As illustrated in FIG. 11, the method may include determining if the change included the bucket value being incremented, as in 610. If so, shown as the positive exit from 610, the method may include determining if the previous value was −1, as in 620. If the previous value was −1, shown as the positive exit from 620, the method may include setting the bit in the macro array value (i.e., in the bitmask) corresponding to the particular bucket in the group of bucket index values that was incremented to 0, as in 630. In other words, if the previous value was −1 (a non-zero value) and it was incremented (giving it a value of 0), the bit associated with the bucket may be set to 0 to reflect that the bucket value is now 0.

If the previous value of the incremented bucket value was not −1, shown as the negative exit from 620, the method may include determining if the previous value was 0, as in 625. If the previous value was 0, shown as the positive exit from 625, the method may include setting the bit in the macro array value (i.e., in the bitmask) corresponding to the particular bucket in the group of bucket index values that was incremented to 1, as in 640. In other words, if the previous value was 0, but it was incremented, the new value is non-zero, and the bit associated with the bucket may be set to 1 to reflect that the bucket value is now non-zero. If the previous value of the incremented bucket was neither −1 or 0 (i.e., it was a non-zero value other than −1), shown as the negative exit from 625, the method may include no change to the corresponding bit in the macro array value (i.e., in the bitmask), since this bit already indicated that the bucket has a non-zero value and it remains a non-zero value. This is shown in 680.

If the changed bucket value was not incremented, shown as the negative exit from 610, the bucket value may have been decremented. In the example illustrated in FIG. 11, if the bucket value was decremented, the method may include determining if the previous bucket value was 1, as in 650. If the previous value was 1, shown as the positive exit from 650, the method may include setting the bit in the macro array value (i.e., in the bitmask) corresponding to the particular bucket in the group of bucket index values that was decremented to 0, as in 660. In other words, if the previous value was 1 (a non-zero value) and it was decremented (giving it a value of 0), the bit associated with the bucket may be set to 0 to reflect that the bucket value is now 0.

If the previous value of the decremented bucket value was not 1, shown as the negative exit from 650, the method may include determining if the previous value was 0, as in 655. If the previous value was 0, shown as the positive exit from 655, the method may include setting the bit in the macro array value (i.e., in the bitmask) corresponding to the particular bucket in the group of bucket index values that was decremented to 1, as in 670. In other words, if the previous value was 0, but it was decremented, the new value is non-zero, and the bit associated with the bucket may be set to 1 to reflect that the bucket value is now non-zero. If the previous value of the decremented bucket was neither 1 or 0 (i.e., it was a non-zero value other than 1), shown as the negative exit from 655, the method may include no change to the corresponding bit in the macro array value (i.e., in the bitmask), since this bit already indicated that the bucket has a non-zero value and it remains a non-zero value. This is shown in 680.

A histogram merging technique may in some embodiments take advantage of such a bit mask to improve the performance of the merge. In one example, the bit mask may be used as a flag to test whether there are any non-zero counts in a group of bucket values. This may be illustrated using the following example.

```
nBase = 0
while(nBase < B)
```

-continued

```
{
    if (C[nBase >> rBits] != 0)
    {
        nMax = nBase + R−1
        For i = nBase to nMax
            H3[i]=H1[i] + H2[i]
    }
    nBase += R;
}
```

In other words (using the same assumptions as in the previous examples), for each group of bucket values represented by the bitmask, if the bitmask is 0 (e.g., all bucket values in the group are 0), the bucket values of the two histograms may not be merged and the corresponding bucket values for H3 may be the same as those of H1. However, if the bitmask is non-zero (e.g., at least one of the bucket values is not 0), the bucket values in H1 and H2 for all the buckets in the group may be merged to produce a corresponding bucket value for H3, in this example.

A method for sparse histogram merging using a bitmask as a flag for a group of bucket values, as described above, may in some embodiments include operations substantially similar to those illustrated in FIG. 10.

In another embodiment, a bitmask generated and maintained as described above may be used as a switch to choose between optimized unrolled loops for the corresponding bit patterns. In the example pseudo-code below, this is shown as a switch statement on each value in C[ ], although it could also be implemented using function pointers or other programming structures in other embodiments.

```
nBase = 0
while(nBase < B)
{
    switch (C[nBase >> rBits] != 0)
    {
        case 0:
            // Do nothing!
            break;
        case 1: // Bit 1
            i = nBase;
            H3[i]=H1[i] + H2[i];
            break;
        case 2: // Bit 2
            i = nBase + 1;
            H3[i]=H1[i] + H2[i];
            break;
        case 3: // Bits 1 and 2
            i = nBase;
            H3[i]=H1[i] + H2[i]; i++;
            H3[i]=H1[i] + H2[i];
            break;
        ...
        case rMask:
            H3[i]=H1[i] + H2[i]; i++;
            H3[i]=H1[i] + H2[i]; i++;
            ...
            break;
        // Continue up to i == rMask
    }
    nBase += R;
}
```

In other words, the pseudo-code above illustrates that the value of each entry in C[ ] may be tested and different program instructions may be executed for each different value of the entry. In this example, it is assumed that rBits=3 and R=8. The first iteration of the loop may examine the bitmask value stored in C[0]. If the value of C[0] is 0, no bucket values in this group need be merged. If the value of C[0] is 1, only the first bit is set (corresponding to the first bucket index, 0), and only the bucket values of H1 and H2 for bucket index 0 may be merged to produce a corresponding bucket value for H3. If the value of C[0] is 2, only the second bit is set (corresponding to the second bucket index, 1), and only the bucket values of H1 and H2 for bucket index 1 may be merged to produce a corresponding bucket value for H3. If the value of C[0] is 3, the first and second bits are set (corresponding to the first and second bucket indexes, 0 and 1), and the bucket values of H1 and H2 for bucket indexes 0 and 1 may be merged to produce corresponding bucket values for H3, and so on.

Figure 12:
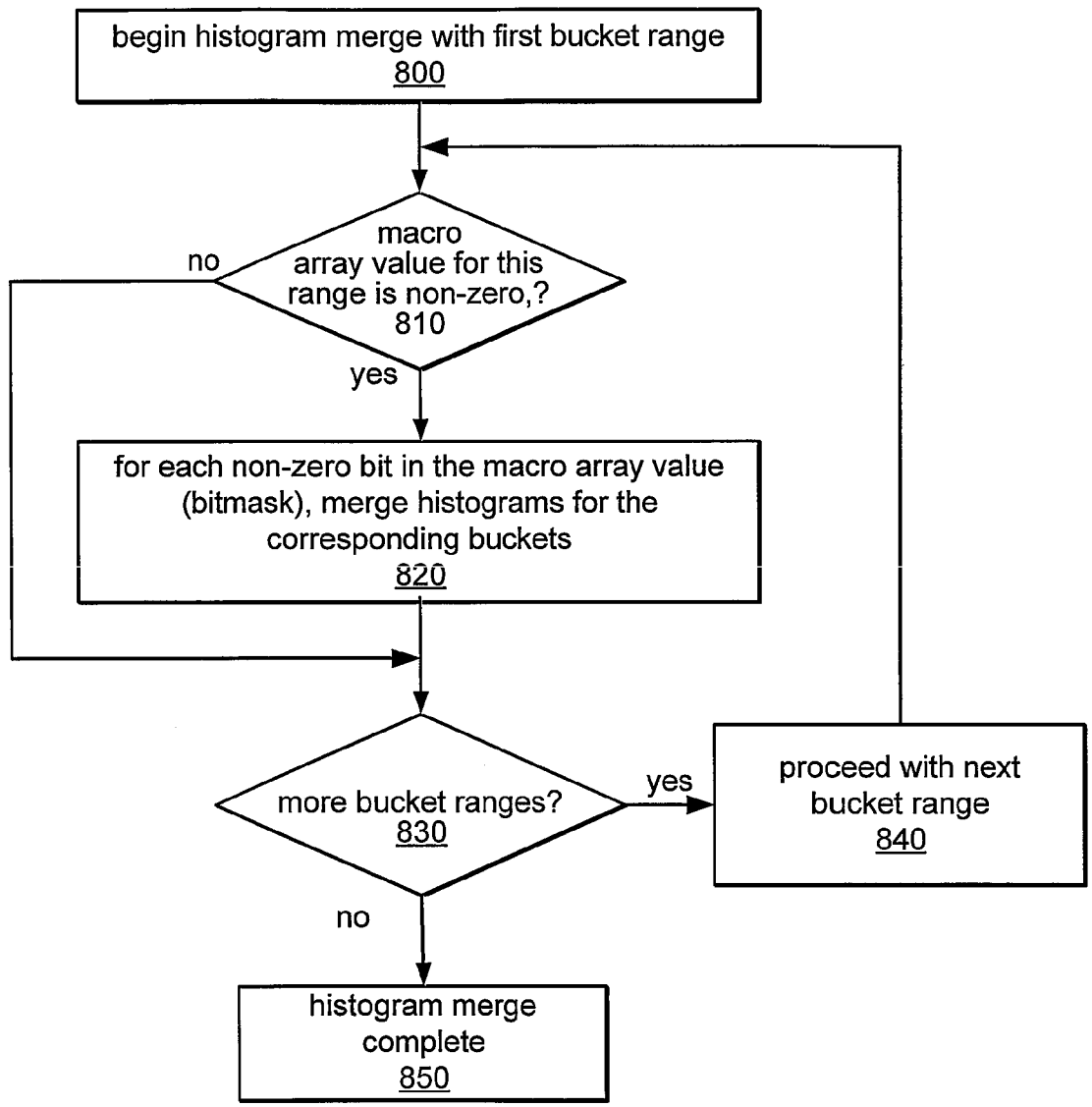
FIG. 12 illustrates one embodiment of a method for performing sparse histogram merging using an array of bitmasks indicating non-zero values in a histogram.

The method described above may be further illustrated by the flow chart depicted in FIG. 12. In this example, the merging of two histograms H1 and H2 may begin at the first bucket index value (e.g., bucket index 0), as in 800. In this example, it is assumed that a macro array C[ ] may be initialized and maintained whose entries represent the number of non-zero entries in every group of eight buckets in histogram H2. The method may include determining if the macro array value corresponding to a bucket group that includes the first bucket is non-zero, as in 810. In other words, the method may include determining if all of the buckets in this group have values of 0 or if any of them has a value that is non-zero. If the macro array value for the group of buckets is non-zero, shown as the positive exit from 810, the method may include merging the histograms of H1 and H2 for each of the bucket values in the range represented by the macro array value for which the corresponding bit in the bitmask is set. This is illustrated at 820.

On the other hand, if the macro array value associated with this bucket group is 0, shown as the negative exit from 810, all of the bucket values with indexes in the corresponding range are 0. In this case, the method may include not merging the bucket values of H1 and H2 for any of the buckets in this bucket group (i.e., the operation illustrated at 820 may be skipped for the buckets in this group and the corresponding bucket values of H3 may be the same as those of H1).

As illustrated in FIG. 12, the method may include determining if there are more buckets that may potentially be merged, as in 830. If there are more buckets that may potentially be merged, shown as the positive exit from 830, the method may include proceeding with the first bucket in the next bucket range, as in 840. In this example, since each macro array value represents a bitmask associated with a group of eight buckets, the first bucket in the next bucket group may be the ninth bucket (e.g., a bucket with a bucket index of 8). The method may include repeating the operations illustrated at 810-830 for each bucket group until all the buckets in groups with non-zero macro array values and corresponding bit values have been merged.

Once all buckets have been merged or skipped (depending on their corresponding macro array values and/or bit values), illustrated as the negative exit from 830, the histogram merging may be complete, as in 850.

In another embodiment, a bitmask may be generated and maintained as described above, but the method may not rely on a switch statement or function for branching. Instead, the method may include the use of a pre-computed table or a function that for a given value of a bitmask, returns the location of the first non-zero bit in the bitmask. For example, an assembly language instruction called Bit Scan Forward (or BSF) is included in Intel® instruction set architectures, and a Find First One in a Bit Field (BFFFO) instruction is included in Motorola 68000 family instruction set architectures. Other instruction set architectures may include a similar function. A method for sparse histogram merging using such a function is illustrated below by way of a pseudo-code example.

The pseudo-code example below uses an array BSF[ ] that contains the first non-zero bit location for each index value, e.g. BSF[1] is 0, BSF[2] is 1, BSF[3] is 0, BSF[4] is 2 etc. In this example, BSF[ ] may be defined for a number of entries up to tableSize, where tableSize is 2 to the power of tableBits. The value of tableMask, in this example, is tableSize minus one. In this example, the value of tableBits is 8.

```
nBase = 0
while(nBase < B)
{
   bitMask = C[nBase >> rBits];
   i = nBase;
   while(bitMask != 0)
   {
      // Eliminate blocks of pixels that are all 0
      while((bitMask & tableMask) == 0)
      {
         i += tableBits;
         bitmask = bitmask >> tableBits;
      }
      location = BSF[bitMask & tableMask];
      i += location;
      H3[i]= H1[i] + H2[i];
      i++;
      bitMask = bitMask >> (location + 1);
   }
   nBase += R;
}
```

In one embodiment illustrated by the pseudo-code above, the method may include, for each value of C[ ] (i.e., each bitmask corresponding to a group of bucket values in histogram H2), determining the least significant bit of the bitmask that has a non-zero value using the BSF table. In this example, the bucket values in histograms H1 and H2 for the buckets corresponding to that location in the bitmask may be merged to produce a bucket value for histogram H3. In this example, the bitmask may then be shifted to remove the first non-zero bit and the operations may be repeated. In other words, the next least significant bit of the bitmask may be located and the corresponding bucket values in histograms H1 and H2 merged, until there are no other non-zero bits in the bitmask.

In embodiments in which finding the first non-zero bit may be implemented using an assembly language instruction, illustrated here as a function called BSF, the pseudo-code above may be reduced as follows:

```
nBase = 0
while(nBase < B)
{
   bitMask = C[nBase >> rBits];
   i = nBase;
   while(bitMask != 0)
   {
      location = BSF(bitMask);
      i += location;
      H3[i]= H1[i] + H2[i];
      i++;
      bitMask = bitMask >> (location + 1);
   }
   nBase += R;
}
```

Figure 13:
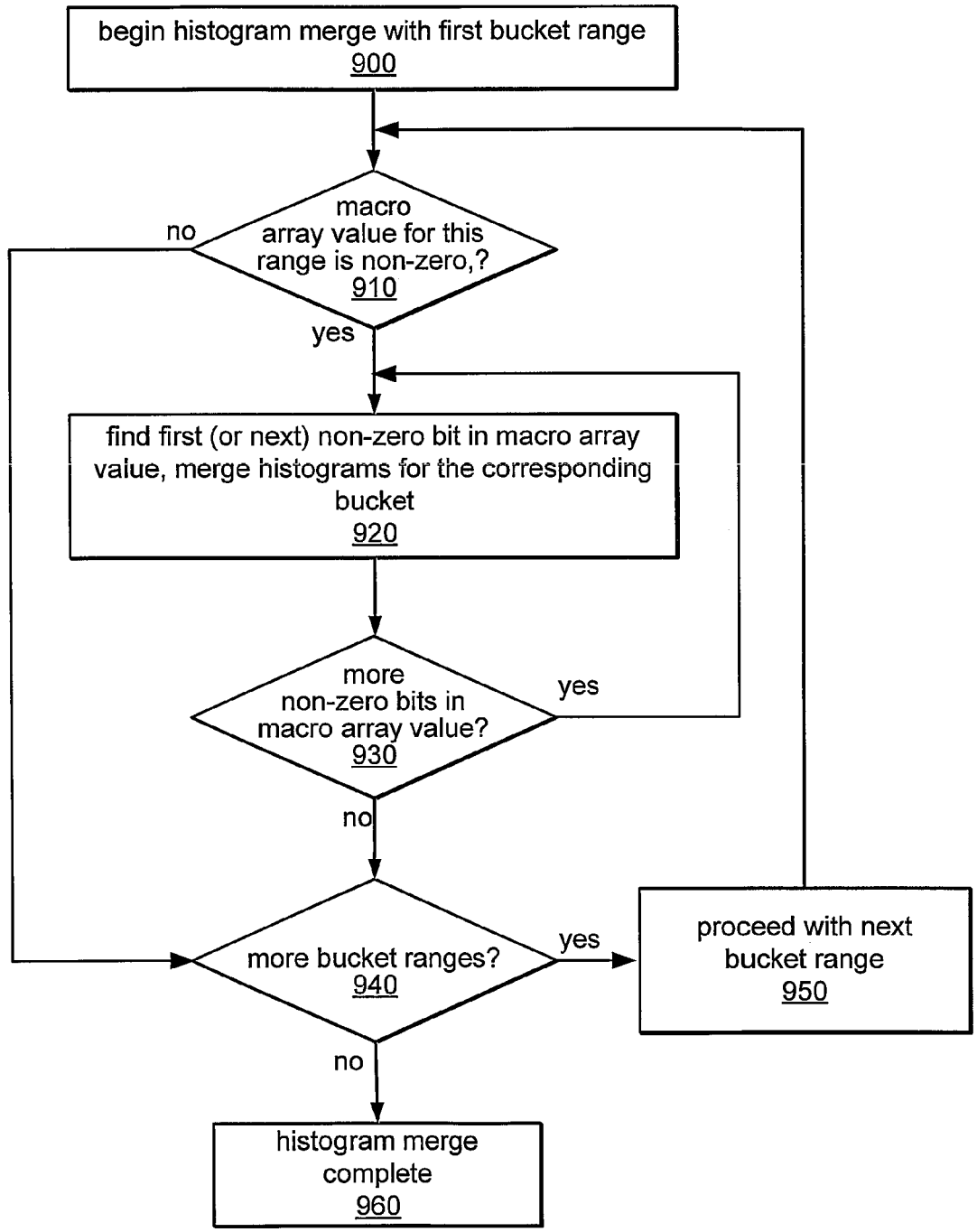
FIG. 13 illustrates a method for performing sparse histogram merging using an array of bitmasks indicating non-zero values in a histogram that includes identifying the first non-zero bit in an array entry, according to one embodiment.

The methods described above for performing sparse histogram merging using a bitmask and an array or function to locate each non-zero bit in the bitmask may be further illustrated by the flow chart depicted in FIG. 13. In this example, the merging of two histograms H1 and H2 may begin with a first bucket range, as in 900. In this example, it is assumed that a macro array C[ ] may be initialized and maintained whose entries are bitmasks indicating which histogram entries in a group of eight histogram entries in histogram H2 are non-zero. In other words, each bit in the bitmask contained in an entry of C[ ] represents one of the histogram entries (i.e., one bucket value in this group of eight bucket values).

As illustrated in FIG. 13, the method may include determining if the macro array value corresponding to the first bucket group is non-zero, as in 910. In other words, the method may include determining if all of the buckets in this group have values of 0 or if any of them has a value that is non-zero. If the macro array value for the group of buckets is non-zero, shown as the positive exit from 910, the method may include merging the histograms of H1 and H2 for the bucket value corresponding to the first (e.g., the least significant) non-zero bit in the bitmask contained in the macro array entry. This is illustrated at 920. As described above, this may in some embodiments involve determining the location of the first non-zero bit in the bitmask using a pre-computed table or a function configured to return the location of the first non-zero bit.

As illustrated in FIG. 13, the method may include determining if there are any more non-zero bits in the macro array value, as in 930. As described above, this may involve shifting the bitmask value to remove the first non-zero bit and determining the next non-zero bit in much the same manner that the first non-zero bit was located, in various embodiments.

On the other hand, if the macro array value associated with this bucket group is 0, shown as the negative exit from 910, all of the bucket values with indexes in the corresponding range are 0. In this case, the method may include not merging the bucket values of H1 and H2 for any of the buckets in this bucket group (i.e., the operations illustrated at 920 and 930 may be skipped for all of the buckets in this group and the corresponding bucket values of H3 may be the same as those of H1).

As illustrated in FIG. 13, the method may include determining if there are more bucket ranges including buckets that may potentially be merged, as in 940. If there are more bucket range to consider, shown as the positive exit from 940, the method may include proceeding with the next bucket range, as in 950. In this example, since each macro array value represents a bitmask associated with a group of eight buckets, the next bucket group may include the ninth bucket value through the sixteenth bucket value (e.g., the buckets with bucket indexes from 8 to 15). The method may include repeating the operations illustrated at 910-940 for each bucket group until all bucket values corresponding to non-zero bits in the macro array have been merged.

Once all bucket values have been merged or skipped (depending on their corresponding macro array values and/or bit values), illustrated as the negative exit from 940, the histogram merging may be complete, as in 960.

In some embodiments, a tradeoff associated with the methods presented herein for merging sparse histograms may be that the merging loop includes some additional computation outside the inner loop, making the increment and decrement steps (scattering updates to the histogram) slightly more expensive. However, for cases in which the number of increments and decrements (between histogram merges) is much smaller than the number of histogram buckets and one of the histograms is relatively sparse, these methods may result in significant performance improvements over methods in which all buckets of the histograms are merged. Since sparsity may occur more frequently with large histograms (e.g. 16-bit histograms) and/or with histograms that represent a column of a pixels rather than a rectangular region, these methods may be especially suited for application to the integral histogram convolution techniques described herein.

While several of the examples described herein involve merging histograms by adding and/or subtracting their bucket values, in some embodiments, the methods described above for histogram merging may be applied to other merging operations, such as finding a maximum value using a running histogram. For example, a column or region histogram may include an indication (or count) of each pixel value associated with any pixel of the column or region, and combining two such histograms for a next region histogram may involve determining which additional values are, or are not, found in the new region. The maximum value for the new region may then be identified from the merged histogram.

In some embodiments, the methods described herein may be implemented using a hierarchy of histograms to represent an input image for use in various filtering operations. For example, in one embodiment, a second histogram may be generated that includes one-eighth the number of histogram values as the number of bucket values stored in a first histogram (e.g., each bucket in the second histogram may store a count of the number of pixels having a value in a range of 8 pixel values). In such embodiments, a method for median filtering may first perform histogram convolution on this second histogram to perform a coarse filtering operation (e.g., the method may examine the counts for these coarse buckets in order to narrow down the range buckets in which to search for the median bucket value), and then a finer filtering operation may be performed to identify the particular bucket value within that range of bucket values that is the median value.

Figure 14:
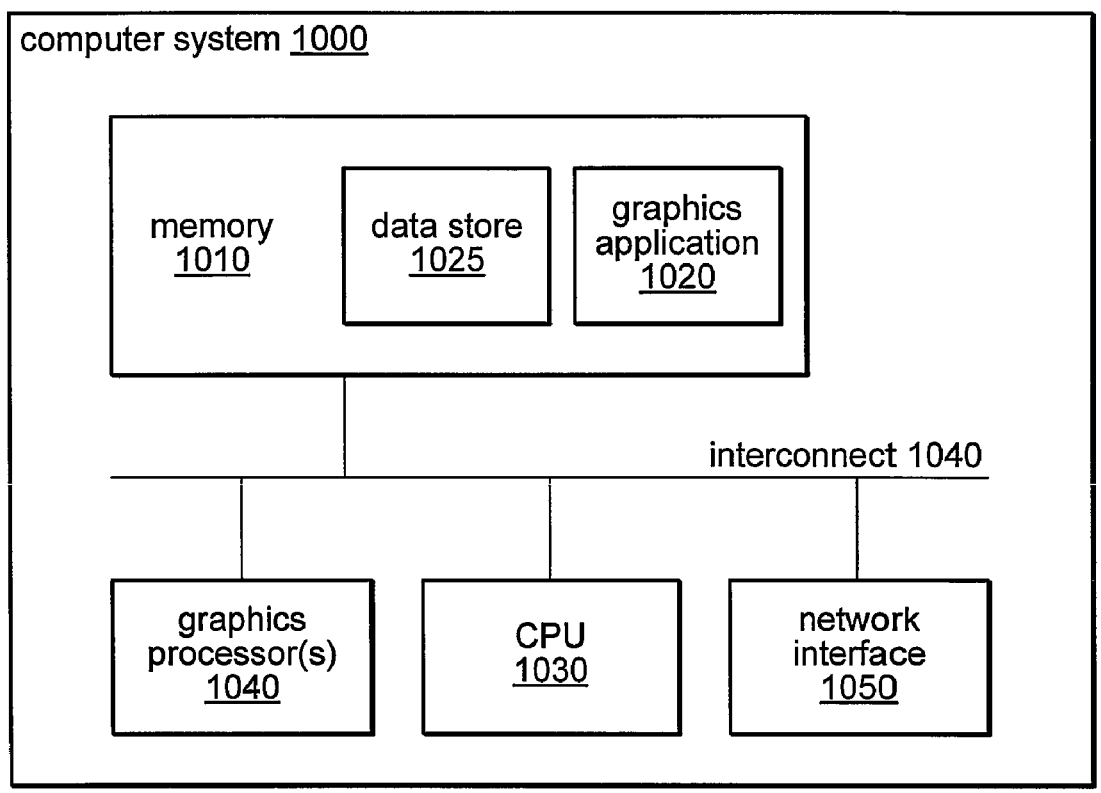
FIG. 14 is a block diagram illustrating one embodiment of a computer system suitable for implementing the methods described herein.

FIG. 14 is a block diagram illustrating one embodiment of a computer system 1000 suitable for implementing the methods for convolution-based image filtering and sparse histogram merging described herein. A computer system 1000 may include a processor unit (CPU) 1030 (possibly including multiple processors, a single threaded processor, a multi-threaded processor, a multi-core processor, or other type of processor). The computer system 1000 may also include one or more system memories 1010 (e.g., one or more of cache, SRAM DRAM, RDRAM, EDO RAM, DDR RAM, SDRAM, Rambus RAM, EEPROM, or other memory type), an interconnect 1040 (e.g., a system bus, LDT, PCI, ISA, or other bus type), and a network interface 1050 (e.g., an ATM interface, an Ethernet interface, a Frame Relay interface, or other interface). The memory medium 1010 may include other types of memory as well, or combinations thereof. The CPU 1030, the network interface 1050, and the memory 1010 may be coupled to the interconnect 1040. It should also be noted that one or more components of system 1000 might be located remotely and accessed via a network. One or more of the memories 1010 may embody a graphics application 1020.

A graphics application such as graphics application 1020 may be configured to perform convolutions on image data as part of various filtering functions and to render new images according to the convolutions. For example, graphics application 1020 may perform median filtering, box bilateral filtering, or other filtering operations by performing convolutions on the pixel values of an input image using various histograms and/or acceleration data structures (e.g., macro arrays indicating non-zero histogram entries), according to various embodiments. Graphics application 1020 may be configured to render the second image to a separate window (such as a compositing or layered window) or directly into the same frame buffer containing the original image, in different embodiments.

Graphics application 1020 may represent various types of graphics applications, such as painting, publishing, photography, games, animation, and other applications. Additionally, graphics application 1020 may utilize a graphics processor 1040 when rendering or displaying images according to various embodiments. A graphics processing unit or GPU may be considered a dedicated graphics-rendering device for a personal computer, workstation, game console or other computer system. Modern GPUs may be very efficient at manipulating and displaying computer graphics and their highly parallel structure may make them more effective than typical CPUs for a range of complex graphical algorithms. For example, graphics processor 1040 may implement a number of graphics primitive operations in a way that makes executing them much faster than drawing directly to the screen with a host central processing unit (CPU), such as CPU 1030.

As described above, the methods disclosed herein for computing region histograms, column histograms, and acceleration data structures and/or the methods disclosed herein for performing histogram-based convolutions merging on multiple kernels of an image and/or sparse histogram may be implemented by program instructions configured for parallel execution on two or more such GPUs.

Please note that functionality and/or features described herein as being part of, or performed by, graphics application 1020 may, in some embodiments, be part of, or performed by, one or more graphics processors, such as graphics processor 1040. As described above, in some embodiments graphics application 1020 may be configured to render altered images into a separate image layer or separate layered window than input images.

Histogram-based convolution and sparse histogram merging, as described herein, may be implemented on various types of computer systems. Referring again to FIG. 14, computer system 1000 may be any of various types of devices, including, but not limited to, a personal computer system, desktop computer, laptop or notebook computer, mainframe computer system, handheld computer, workstation, network computer, a consumer device, video game console, handheld video game device, application server, storage device, a peripheral device such as a switch, modem, router, or in general any type of computing device.

Graphics application 1020 described herein may be provided as a computer program product, or software, that may include a computer-readable storage medium having stored thereon instructions, which may be used to program a computer system (or other electronic devices) to implement the methods described herein. A computer-readable storage medium includes any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, or other types of signals or mediums.).

In some embodiments, memory 1010 may include program instructions configured to implement graphics application 1020, as described herein. Graphics application 1020 may be implemented in any of various programming languages or methods. For example, in one embodiment, graphics application 1020 may be JAVA based, while in another embodiments, it may be implemented using the C or C++ programming languages. In other embodiments, graphics application 1020 may be implemented using specific graphic languages specifically for developing programs executed by specialize graphics hardware, such as GPU 1040. In addition, graphics application 1020 may be embodied on memory specifically allocated for use by graphics processor(s) 1040, such as memory on a graphics board including graphics processor(s) 1040. Thus, memory 1010 may represent dedicated graphics memory as well as general-purpose system RAM.

Memory 1010 may in some embodiments also include a data store 1025. Data store 1025 may be configured to store image data for one or more input images and/or filtered output images, in various embodiments. Data store 1025 may also be configured to store histogram information (e.g., bucket values for one or more region or column histograms), and/or macro array information (e.g., array entries indicating non-zero bucket values in a histogram), in some embodiments. Information stored in data store 1025 may be organized in any of various data structures, such as in one or more tables, databases, or arrays, and/or may be included in one or more files of any suitable computer-readable format, in various embodiments. Other information not described herein may be included in memory 1010 and/or data store 1025 and may be used to implement the methods described herein and/or other functionality of computer system 1000.

Network interface 1040 may be configured to enable computer system 1000 to communicate with other computers, systems or machines, such as across network 100, described above. Network interface 1040 may use standard communications technologies and/or protocols. Network 100 may include, and network interface 1040 may utilize, links using technologies such as Ethernet, 802.11, integrated services digital network (ISDN), digital subscriber line (DSL), and asynchronous transfer mode (ATM) as well as other communications technologies. Similarly, the networking protocols used on network 100 may include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP), among other network protocols. The data exchanged over network 100 by network interface 1040 may be represented using technologies, languages, and/or formats, such as the hypertext markup language (HTML), the extensible markup language (XML), and the simple object access protocol (SOAP) among other data representation technologies. Additionally, all or some of the links or data may be encrypted using any suitable encryption technologies, such as the secure sockets layer (SSL), Secure HTTP and/or virtual private networks (VPNs), the international data encryption standard (DES or IDEA), triple DES, Blowfish, RC2, RC4, RC5, RC6, as well as other data encryption standards and protocols. In other embodiments, custom and/or dedicated data communications, representation, and encryption technologies and/or protocols may be used instead of, or in addition to, the particular ones described above.

GPUs, such as GPU 1040 may be implemented in a number of different physical forms. For example, GPU 1040 may take the form of a dedicated graphics card, an integrated graphics solution and/or a hybrid solution. GPU 1040 may interface with the motherboard by means of an expansion slot such as PCI Express Graphics or Accelerated Graphics Port (AGP) and thus may be replaced or upgraded with relative ease, assuming the motherboard is capable of supporting the upgrade. However, a dedicated GPU is not necessarily removable, nor does it necessarily interface the motherboard in a standard fashion. The term "dedicated" refers to the fact that hardware graphics solution may have RAM that is dedicated for graphics use, not to whether the graphics solution is removable or replaceable. Dedicated GPUs for portable computers may be interfaced through a non-standard and often proprietary slot due to size and weight constraints. Such ports may still be considered AGP or PCI express, even if they are not physically interchangeable with their counterparts. As illustrated in FIG. 14, memory 1010 may represent any of various types and arrangements of memory, including general-purpose system RAM and/or dedication graphics or video memory.

Integrated graphics solutions, or shared graphics solutions are graphics processors that utilize a portion of a computer's system RAM rather than dedicated graphics memory. For instance, modern desktop motherboards normally include an integrated graphics solution and have expansion slots available to add a dedicated graphics card later. As a GPU may be extremely memory intensive, an integrated solution finds itself competing for the already slow system RAM with the CPU as the integrated solution has no dedicated video memory. For instance, system RAM may experience a bandwidth between 2 GB/s and 8 GB/s, while most dedicated GPUs enjoy from 15 GB/s to 30 GB/s of bandwidth.

Hybrid solutions also share memory with the system memory, but have a smaller amount of memory on-board than discrete or dedicated graphics cards to make up for the high latency of system RAM. Data communicated between the graphics processing unit and the rest of the computer may travel through the graphics card slot or other interface, such as interconnect 1040 of FIG. 14.

While graphics application 1020, which may implement integral histogram convolution and/or sparse histogram merging, has been described herein with reference to various embodiments, it will be understood that these embodiments are illustrative and that the scope of the present invention is not limited to them. Many variations, modifications, additions, and improvements are possible. More generally, the present invention is described in the context of particular embodiments. For example, the blocks and logic units identified in the description are for ease of understanding and not meant to limit the invention to any particular embodiment. Functionality may be separated or combined in blocks differently in various realizations or described with different terminology.

The embodiments described herein are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

Although the embodiments above have been described in detail, numerous variations and modifications will become apparent once the above disclosure is fully appreciated. It is intended that the following claims be interpreted to embrace all such variations and modifications.

What is claimed is:

1. A method, comprising:
performing by one or more computers:
generating a histogram for a region of an input image, wherein the histogram comprises a plurality of bucket values, each dependent on values of pixels in the region;
generating an array comprising a plurality of array values, each associated with one or more of the plurality of bucket values, and each dependent on the plurality of bucket values;
merging the histogram with a second histogram to produce a third histogram, wherein the second histogram comprises a second plurality of bucket values, each bucket value in the second plurality of bucket values dependent on values of pixels in a second region in a same way as corresponding bucket values in the histogram, wherein said merging comprises:
for each non-zero array value, merging at least one of the one or more of the plurality of bucket values associated with the non-zero array value with a corresponding bucket value of the second histogram to generate a third bucket value for a corresponding bucket of the third histogram;
for each array value of zero, including bucket values of the second plurality of bucket values corresponding to the one or more of the plurality of bucket values associated with the array value of zero in buckets of the third histogram; and
rendering a second image dependent on bucket values in the third histogram.

2. The method of claim 1, wherein each of the bucket values comprises a count of pixels in the region having a same pixel value.

3. The method of claim 1, wherein each of the bucket values comprises a weighting dependent on at least one of: values of pixels in the region and locations of pixels within the region.

4. The method of claim 1, wherein each of the array values comprises a count of non-zero bucket values included in the one or more of the plurality of bucket values associated with the array value.

5. The method of claim 1, wherein said merging at least one of the one or more of the plurality of bucket values associated with the non-zero array value with a corresponding bucket value of the second histogram comprises merging all of the one or more of the plurality of bucket values associated with the non-zero array value with a corresponding bucket value of the second histogram.

6. The method of claim 1, wherein each of the array values comprises a bitmask indicating whether each of the one or more of the plurality of bucket values associated with the array value is non-zero.

7. The method of claim 6, wherein said merging at least one of the one or more of the plurality of bucket values associated with the non-zero array value with a corresponding bucket value of the second histogram comprises merging a bucket value associated with the non-zero array value with a corresponding bucket value of the second histogram if and only if the bitmask indicates that the bucket value is non-zero.

8. The method of claim 6, further comprising determining which of the one or more of the plurality of bucket values associated with the array value are non-zero by locating a first non-zero bit in the bitmask.

9. The method of claim 1, wherein said merging at least one of the one or more of the plurality of bucket values associated with the non-zero array value with a corresponding bucket value of the second histogram comprises adding the at least one of the associated one or more of the plurality of bucket values associated with the non-zero array value and the corresponding bucket value of the second histogram.

10. The method of claim 1, further comprising:
in response to a change in a bucket value in the histogram, determining if an array value associated with the bucket value should be changed; and
in response to determining that the bucket value should be changed, updating the array value to reflect the change in the bucket value.

11. The method of claim 10, wherein said determining if an array value associated with the bucket value should be changed comprises:
determining if the change in the bucket value comprises a change in the bucket value from a value of zero to a non-zero value; and
in response to determining that the change in the bucket value comprises a change in the bucket value from a value of zero to a non-zero value, updating the array value to indicate that an additional non-zero bucket value is included in the one or more of the plurality of bucket values associated with the array value.

12. The method of claim 10, wherein said determining if an array value associated with the bucket value should be changed comprises:
determining if the change in the bucket value comprises a change in the bucket value from a non-zero value to a value of zero; and
in response to determining that the change in the bucket value comprises a change in the bucket value from a non-zero value to a value of zero, updating the array value to indicate that one fewer non-zero bucket value is included in the one or more of the plurality of bucket values associated with the array value.

13. A system, comprising:
one or more processors; and
a memory coupled to the one or more processors;
wherein the memory is configured to store program instructions executable by the one or more processors to implement:
generating a histogram for a region of an input image, wherein the histogram comprises a plurality of bucket values, each bucket value being dependent on values of pixels in the region;
generating an array comprising a plurality of array values, each associated with one or more of the plurality of bucket values, and each being dependent on the plurality of bucket values;
merging the histogram with a second histogram to produce a third histogram, wherein the second histogram comprises a second plurality of bucket values, each bucket value in the second plurality of bucket values being dependent on values of pixels in a second region in a same way as corresponding bucket values in the histogram, wherein said merging comprises:
for each non-zero array value, merging at least one of the one or more of the plurality of bucket values associated with the non-zero array value with a corresponding bucket value of the second histogram to generate a third bucket value for a corresponding bucket of the third histogram;
for each array value of zero, including bucket values of the second plurality of bucket values corresponding to the one or more of the plurality of bucket values associated with the array value of zero in buckets of the third histogram; and rendering a second image dependent on bucket values in the third histogram.

14. The system of claim 13, wherein each of the bucket values comprises a count of pixels in the region having a same pixel value.

15. The system of claim 13, wherein each of the bucket values comprises a weighting dependent on at least one of: values of pixels in the region and locations of pixels within the region.

16. The system of claim 13, wherein each of the array values comprises a count of non-zero bucket values included in the one or more of the plurality of bucket values associated with the array value.

17. The system of claim 13, wherein said merging at least one of the one or more of the plurality of bucket values associated with the non-zero array value with a corresponding bucket value of the second histogram comprises merging all of the one or more of the plurality of bucket values associated with the non-zero array value with a corresponding bucket value of the second histogram.

18. The system of claim 13, wherein each of the array values comprises a bitmask indicating whether each of the one or more of the plurality of bucket values associated with the array value is non-zero.

19. The system of claim 18, wherein said merging at least one of the one or more of the plurality of bucket values associated with the non-zero array value with a corresponding bucket value of the second histogram comprises merging a bucket value associated with the non-zero array value with a corresponding bucket value of the second histogram if and only if the bitmask indicates that the bucket value is non-zero.

20. The system of claim 18, wherein the program instructions are further executable by the one or more processors to implement determining which of the one or more of the plurality of bucket values associated with the array value are non-zero by locating a first non-zero bit in the bitmask.

21. The system of claim 13, wherein said merging at least one of the one or more of the plurality of bucket values associated with the non-zero array value with a corresponding bucket value of the second histogram comprises adding the at least one of the associated one or more of the plurality of bucket values associated with the non-zero array value and the corresponding bucket value of the second histogram.

22. The system of claim 13, wherein the program instructions are further executable by the one or more processors to implement:

in response to a change in a bucket value in the histogram, determining if an array value associated with the bucket value should be changed; and in response to determining that the bucket value should be changed, updating the array value to reflect the change in the bucket value.

23. The system of claim 22, wherein said determining if an array value associated with the bucket value should be changed comprises:

determining if the change in the bucket value comprises a change in the bucket value from a value of zero to a non-zero value;

in response to determining that the change in the bucket value comprises a change in the bucket value from a value of zero to a non-zero value, updating the array value to indicate that an additional non-zero bucket value is included in the one or more of the plurality of bucket values associated with the array value;

determining if the change in the bucket value comprises a change in the bucket value from a non-zero value to a value of zero; and in response to determining that the change in the bucket value comprises a change in the bucket value from a non-zero value to a value of zero, updating the array value to indicate that one fewer non-zero bucket value is included in the one or more of the plurality of bucket values associated with the array value.

24. A non-transitory, computer-readable storage medium, storing program instructions that when executed on one or more computers cause the one or more computers to perform:

generating a histogram for a region of an input image, wherein the histogram comprises a plurality of bucket values, each bucket value being dependent on values of pixels in the region;

generating an array comprising a plurality of array values, each associated with one or more of the plurality of bucket values, and each being dependent on the plurality of bucket values;

merging the histogram with a second histogram to produce a third histogram, wherein the second histogram comprises a second plurality of bucket values, each bucket value in the second plurality of bucket values being dependent on values of pixels in a second region in a same way as corresponding bucket values in the histogram, wherein said merging comprises:

for each non-zero array value, merging at least one of the one or more of the plurality of bucket values associated with the non-zero array value with a corresponding bucket value of the second histogram to generate a third bucket value for a corresponding bucket of the third histogram;

for each array value of zero, including bucket values of the second plurality of bucket values corresponding to the one or more of the plurality of bucket values associated with the array value of zero in buckets of the third histogram; and rendering a second image dependent on bucket values in the third histogram.

25. The storage medium of claim 24, wherein each of the bucket values comprises a count of pixels in the region having a same pixel value or a weighting dependent on at least one of: values of pixels in the region and locations of pixels within the region.

26. The storage medium of claim 24, wherein each of the array values comprises a count of non-zero bucket values included in the one or more of the plurality of bucket values associated with the array value or a bitmask indicating whether each of the one or more of the plurality of bucket values associated with the array value is non-zero.

27. The storage medium of claim 24, wherein said merging at least one of the one or more of the plurality of bucket values associated with the non-zero array value with a corresponding bucket value of the second histogram comprises merging all of the one or more of the plurality of bucket values associated with the non-zero array value with a corresponding bucket value of the second histogram.

28. The storage medium of claim 24, wherein said merging at least one of the one or more of the plurality of bucket values associated with the non-zero array value with a corresponding bucket value of the second histogram comprises merging a bucket value associated with the non-zero array value with a corresponding bucket value of the second histogram if and only if the array value indicates that the bucket value is non-zero.

29. The storage medium of claim 24, wherein said merging at least one of the one or more of the plurality of bucket values associated with the non-zero array value with a corresponding bucket value of the second histogram comprises adding the at least one of the associated one or more of the plurality of bucket values associated with the non-zero array value and the corresponding bucket value of the second histogram.

30. The storage medium of claim 24, wherein when executed on one or more computers the program instructions further cause the one or more computers to perform:

in response to a change in a bucket value in the histogram, determining if an array value associated with the bucket value should be changed; and in response to determining that the bucket value should be changed, updating the array value to reflect the change in the bucket value;

wherein said determining if an array value associated with the bucket value should be changed comprises:

determining if the change in the bucket value comprises a change in the bucket value from a value of zero to a non-zero value;

in response to determining that the change in the bucket value comprises a change in the bucket value from a value of zero to a non-zero value, updating the array value to indicate that an additional non-zero bucket value is included in the one or more of the plurality of bucket values associated with the array value;

determining if the change in the bucket value comprises a change in the bucket value from a non-zero value to a value of zero; and in response to determining that the change in the bucket value comprises a change in the bucket value from a non-zero value to a value of zero, updating the array value to indicate that one fewer non-zero bucket value is included in the one or more of the plurality of bucket values associated with the array value.

* * * * *